United States Patent [19]
Johnson et al.

[11] Patent Number: 5,837,946
[45] Date of Patent: Nov. 17, 1998

[54] FORCE SENSITIVE SCALE AND DUAL LOAD SENSOR CELL FOR USE THEREWITH

[75] Inventors: Thomas H. Johnson, Winnebago; Roger A. Younger, Fairmont; Gene L. Justice, Fairmont; Kevin M. Fruechte, Fairmont, all of Minn.

[73] Assignee: Weigh-Tronix, Inc., Fairmont, Minn.

[21] Appl. No.: 491,034

[22] Filed: Jun. 16, 1995

[51] Int. Cl.⁶ .................................................. G01G 19/08
[52] U.S. Cl. ........................ 177/136; 177/139; 177/211; 177/210 R
[58] Field of Search .................. 177/136, 139, 177/211

[56] References Cited

U.S. PATENT DOCUMENTS

| | | | |
|---|---|---|---|
| 2,356,913 | 8/1944 | Berman | 254/10 |
| 2,643,781 | 6/1953 | Wise | 214/2 |
| 2,822,095 | 2/1958 | Buckingham | 214/2 |
| 2,935,213 | 5/1960 | Cellitti et al. | 214/2 |
| 2,940,746 | 6/1960 | Anderson et al. | 265/40 |
| 3,059,710 | 10/1962 | Pien | 177/136 |
| 3,063,576 | 11/1962 | Hofmeister | 214/2 |
| 3,066,807 | 12/1962 | Draxler | 214/2 |
| 3,140,450 | 7/1964 | Tavis | 331/40 |
| 3,196,966 | 7/1965 | Kennedy | 177/139 |
| 3,320,569 | 5/1967 | Jones | 338/5 |
| 3,332,506 | 7/1967 | Bradfield | 177/210 |
| 3,479,536 | 11/1969 | Norris | 310/8.5 |
| 3,541,849 | 11/1970 | Corbett | 73/141 |
| 3,554,025 | 1/1971 | Andersson et al. | 73/141 |
| 3,695,096 | 10/1972 | Kutsay | 73/88.5 R |
| 3,712,395 | 1/1973 | Streater et al. | 177/210 |
| 3,777,828 | 12/1973 | Dietemeyer | 177/165 |
| 3,869,004 | 3/1975 | Gallo et al. | 177/25 |
| 3,899,924 | 8/1975 | Klein | 73/141 A |
| 3,910,363 | 10/1975 | Airesman et al. | 177/139 |
| 3,949,603 | 4/1976 | Laimins | 73/141 A |
| 3,951,221 | 4/1976 | Rock | 177/1 |
| 3,960,228 | 6/1976 | Nordstrom | 177/211 |
| 3,991,840 | 11/1976 | Rawcliffe | 177/210 |
| 4,020,448 | 4/1977 | Corbett | 340/85 |
| 4,041,289 | 8/1977 | Brosh et al. | 235/151.33 |
| 4,080,657 | 3/1978 | Caldicott et al. | 364/567 |
| 4,089,058 | 5/1978 | Murdock | 364/571 |
| 4,175,243 | 11/1979 | Corbett | 310/338 |
| 4,212,360 | 7/1980 | Chesher | 177/139 |
| 4,219,089 | 8/1980 | Gard et al. | 177/165 |
| 4,239,088 | 12/1980 | Check et al. | 177/210 FP |
| 4,323,132 | 4/1982 | Bradley | 177/139 |
| 4,421,186 | 12/1983 | Bradley | 177/139 |
| 4,485,323 | 11/1984 | Corbett | 310/338 |
| 4,503,922 | 3/1985 | Brosh et al. | 177/210 EM |
| 4,535,638 | 8/1985 | EerNisse et al. | 73/862.59 |
| 4,545,445 | 10/1985 | Naito | 177/25 |
| 4,598,381 | 7/1986 | Cucci | 364/558 |
| 4,691,290 | 9/1987 | Griffen | 364/567 |
| 4,751,849 | 6/1988 | Paros et al. | 73/862.59 |
| 4,804,875 | 2/1989 | Albert | 310/323 |
| 4,838,369 | 6/1989 | Albert | 177/210 FP |
| 4,858,145 | 8/1989 | Inoue et al. | 364/506 |
| 4,909,338 | 3/1990 | Vitunic et al. | 177/50 |
| 5,197,334 | 3/1993 | Guziak | |
| 5,243,545 | 9/1993 | Ormond | 364/571.01 |
| 5,296,655 | 3/1994 | Sargent et al. | 177/199 |
| 5,313,023 | 5/1994 | Johnson | 177/229 |
| 5,336,854 | 8/1994 | Johnson | 177/210 FP |
| 5,391,070 | 2/1995 | Ito et al. | 425/135 |

*Primary Examiner*—Cassandra C. Spyrou
*Assistant Examiner*—Anh Mai
*Attorney, Agent, or Firm*—Gray Cary Ware & Freidenrich

[57] ABSTRACT

A force sensitive scale and dual sensor load cells for use therewith isolate, measure, and reject out residual rejected effects from the output of the scale. By isolating residual rejected effects, the overall accuracy of the scale may be improved, and the scale may be made substantially insensitive to the position of an object on the scale. In addition, where a scale includes multiple load cells coupled in parallel to a load receiving member and spaced apart in the direction of the force vector, the outputs of the load cells may be effectively scaled to cancel out frictional effects inherent in the scale.

38 Claims, 9 Drawing Sheets

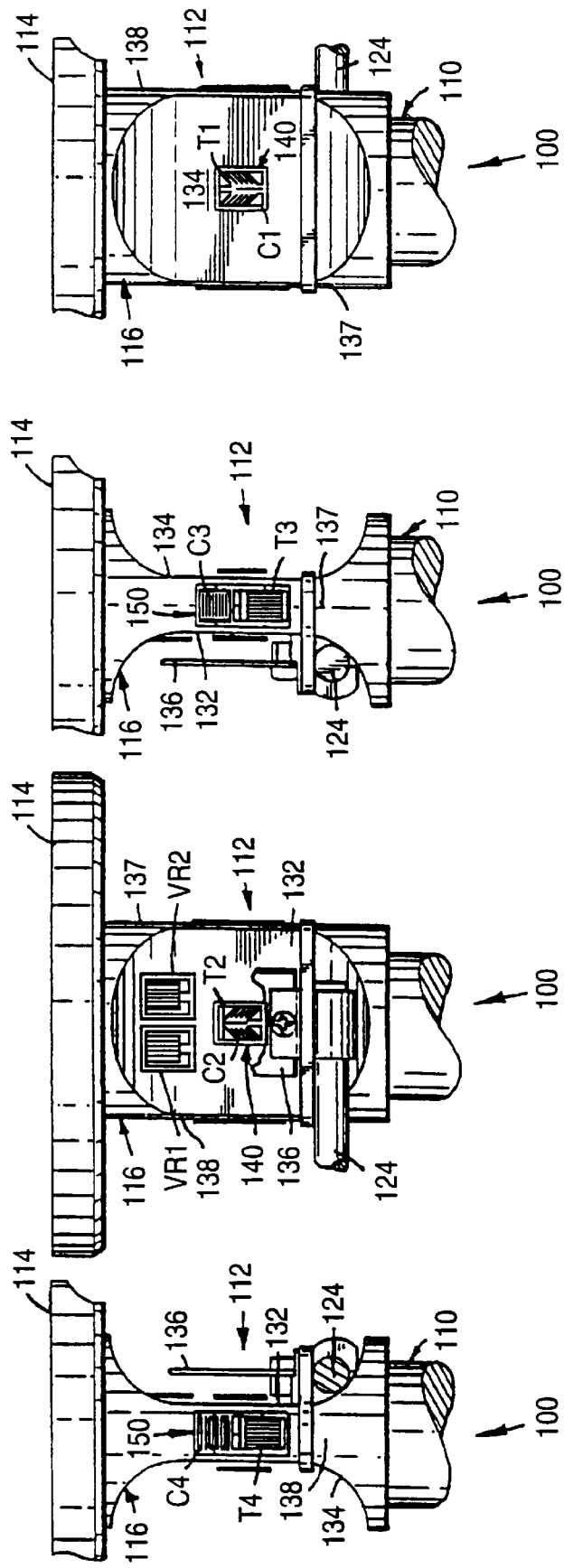

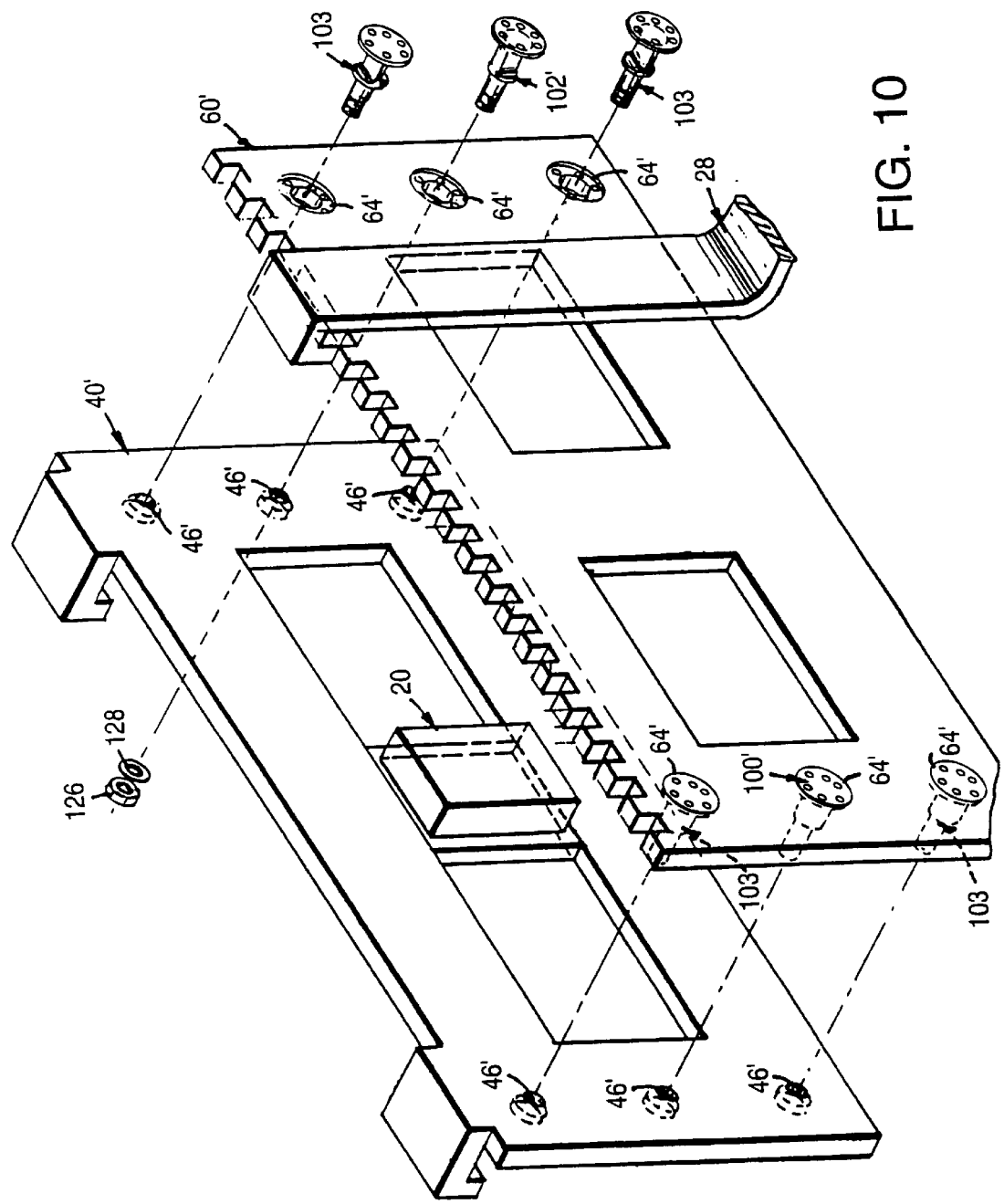

FORCE SENSITIVE SCALE AND DUAL LOAD SENSOR CELL FOR USE THEREWITH

FIELD OF THE INVENTION

The invention is directed generally to the area of force measurement, for example in force sensitive scales such as those used on lift trucks and the like. The invention is in particular directed to a scale and a load cell used therein which reject many non-load force effects, such that the scale exhibits increased accuracy and reduced sensitivity to the position of objects on the scale.

BACKGROUND OF THE INVENTION

Force sensitive scales, i.e., scales which are capable of measuring the applied force due to gravity of an object placed upon the scale, have numerous applications. One such application, for example, is on lift trucks, or forklifts, to weigh objects which are lifted and transported by the forks of the lift truck as they are being transported. Lift truck scales preferably do not require any specific operation by an operator of the lift truck other than positioning the truck and lifting the objects. As a result, the weighing operation is very efficient and non-intrusive.

One example of a lift truck scale which is particularly useful in the art is the subject of U.S. Pat. No. 4,421,186 to Bradley, which is incorporated by reference herein. Generally, Bradley discloses a lift truck scale including a vertically oriented plate that is mounted to the existing crossbars disposed on the front of a standard lift truck. The plate is mounted through four load-bearing load cells arranged into two laterally-spaced vertical columns, which serve as the sole mechanical connection between the scale and the existing crossbars. The conventional forks used with the lift truck are hung off of the vertical plate in the same manner as they would the crossbars, whereby a load present on the forks is transferred across the load cells by the vertical plate.

Each load cell in the Bradley design includes four strain gauges connected in a wheatstone bridge circuit to reject many non-load force effects. Moreover, the outputs of the load cells are summed to provide the total weight reading for the scale.

The Bradley lift truck scale is capable of rejecting many non-load force effects (i.e., forces and moments which are not found along the primary force vector that is being measured). The Bradley scale is therefore relatively accurate, typically having an accuracy of about 1%. Bradley also has the advantage that it is easy to install on conventional lift trucks, thereby making it relatively cost effective. Also, the Bradley scale has a low profile which does not significantly decrease the overall carrying capacity of the lift truck.

On the other hand, the Bradley scale has been found to exhibit some degree of position sensitivity despite efforts to reduce the variations that occur as a result of different positioning of objects on the forks. These effects are most prevalent in the fore/aft direction (i.e., along the longitudinal axes of the forks), primarily due to "end effects" applied to the load cells at some positions. The end effects are maximized when an object is located near the tips of the forks, as a relatively large horizontal separation exists between the load cells and the object in this position, resulting in non-load forces that are comparable in magnitude to the load forces along the primary force vector for the scale.

By "end effects", we mean primarily end loads and end moments, as well as other forces, that result in forces applied to the load cells that are not along the force vector of the desired forces to be measured (i.e., those representing the weight of an object). These end effects are mostly rejected in scales such as Bradley by the mechanical structure of the load cells and the strain gauge bridge circuits. However, it has been found that, particularly in lift truck scales where end effects are relatively great, these end and other effects are not purely rejected. This results in "residual rejected effects" being present in the output signal of each load cell, thereby limiting the accuracy of the scale and making the scale sensitive to the position of objects thereon.

It has also been found that the vertical arrangement of pairs of load cells in the Bradley scale may introduce some degree of frictional effects (primarily creep and hysteresis) into the outputs of the load cells due to slippage in the mechanical couplings between the plate and the load cells, as well as due to relaxation in the structures of the plate and the load cells alike. In theory, a pair of vertically oriented load cells coupled in parallel should perfectly share a load such that the summed outputs of the cells remain constant even if the load is shifted between the load cells. In practice, however, it has been found that these frictional effects may limit this load sharing effect and introduce lag errors into the system, also reducing the accuracy of the scale.

Therefore, a substantial need exists for a scale and load cells for use therewith which more perfectly reject residual rejected effects and frictional effects from the outputs of the load cells. In addition, a need exists for a scale which is of greater accuracy and reduced sensitivity to the position of objects on the scale.

SUMMARY OF THE INVENTION

The invention addresses these and other problems associated with the prior art in first providing a scale and a load cell therefor which separately isolate, measure and reject out residual rejected effects from the output of the scale, thereby offering such advantages as increased accuracy and load position insensitivity. The invention also addresses many problems in the art by also providing a scale in which the outputs of multiple load cells coupled in parallel by a non-perfect load receiving member and spaced apart in the direction of the primary force vector are scaled in such a manner that frictional effects (typically creep and hysteresis) present in the load cells and the load receiving member are rejected from the output of the scale.

By "residual rejected effects", we mean any non-load forces, applied in one or more force vectors which are separate from the force vector of the desired force to be measured. These types of effects, if not rejected, will typically introduce errors into the outputs of the load cells, as well as the summed output of the scale.

These types of effects are termed "rejected" because they are the effects that are typically reduced by means of the particular structure of a load cell and the arrangement of force sensors thereupon, as well as by electrical means such as wheatstone bridge circuits. These effects are also termed "residual" because many of these effects will still affect the output of the scale to a degree even after mechanical or electrical rejection of most of the effects. However, it will be appreciated that it is not necessary that the effects be reduced by other means in the load cell, as the invention may be capable in some instances of being the only mechanism rejecting the effects.

By "frictional effects", we mean effects that are typically as a result of imperfect mounting between load cells and load receiving members, as well as imperfect spring characteristics within the load cells and the load receiving members. These effects typically result in hysteresis and creep being exhibited in the outputs of the scales subjected to such effects.

Therefore, according to one aspect of the invention, a load cell is provided, which includes a load cell body; a first force sensor positioned on the load cell body to sense a first force applied to the load cell body along a first force vector, and provide a first output representative thereof; a second force sensor positioned on the load cell body to sense a second force applied to the load cell body along a second force vector, and provide a second output representative thereof; and rejection means, coupled to receive the first and second outputs, for rejecting residual rejected effects due to the second force from the first output and generating a third output representative thereof.

According to another aspect of the invention, a method is provided for sensing force with a load cell of the type having a load cell body and first and second force sensors positioned thereon to sense forces applied to the load cell body respectively along first and second force vectors. The method includes the steps of sensing a first force applied to the load cell body along the first force vector with the first force sensor and generating a first output representative thereof; sensing a second force applied to the load cell body along the second force vector with the second force sensor and generating a second output representative thereof; and scaling the first output in response to the second output to reject residual rejected effects from the first output.

In accordance with an additional aspect of the invention, there is provided a scale which includes a base; a force receiving member adapted to receive an object to be weighed; a plurality of load cells coupled between the force receiving member and the base to deflect in response to a force applied to the force receiving member by the object, each load cell having a first output primarily responsive to at least a portion of the force applied by the object, and a second output primarily responsive to residual rejected effects sensed by the load cell; and load cell driving means for providing a force signal representative of the force applied to the force receiving member by the object. The driving means includes rejection means, coupled to the first and second outputs of each load cell, for rejecting residual rejected effects from the first output of each load cell; cornering means for adjusting the relative sensitivities of the first outputs of the load cells such that the sum of the first outputs is substantially insensitive to the position of the object on the force receiving member; and summing means for summing the first outputs of the load cells to provide the force signal.

In accordance with a further aspect of the invention, a method is provided for weighing an object on a scale of the type including a plurality of load cells coupled between a force receiving member and a base to deflect in response to a force applied to the force receiving member by the object, each load cell having a first output primarily responsive to at least a portion of the force applied by the object, and a second output primarily responsive to residual rejected effects sensed by the load cell. The method includes the steps of rejecting residual rejected effects from the first output of each load cell by scaling the first output of each load cell in response to the second output of the load cell; adjusting the relative sensitivities of the first outputs of the load cells such that the sum of the first outputs is substantially insensitive to the position of the object on the force receiving member; and summing the first outputs of the load cells to provide the force signal.

According to another aspect of the invention, a scale is provided, which includes a base; a force receiving member adapted to receive a force applied along a force vector; first and second load cells, coupled between the force receiving member and the base in parallel and spaced apart on the force receiving member generally in the direction of the force vector such that the load cells share the force, each load cell providing an output representative of at least a portion of the force applied along the force vector; and load cell driving means for providing a force signal representative of the force applied to the force receiving member by summing the outputs of the load cells, the driving means including frictional effect rejecting means for adjusting the relative sensitivities of the outputs of the load cells to reject frictional effects in the scale.

According to an additional aspect of the invention, a method is provided for weighing an object on a scale of the type including first and second load cells coupled between a force receiving member and a base in parallel and spaced apart on the force receiving member generally in the direction of an applied force vector such that the load cells share an applied force. The method includes the steps of, on each load cell, providing an output representative of at least a portion of the force applied along the applied force vector; adjusting the relative sensitivities of the outputs of the load cells to reject frictional effects in the scale; and providing a force signal representative of the force applied to the force receiving member by summing the outputs of the load cells.

These and other advantages and features, which characterize the invention, are set forth in the claims annexed hereto and forming a further part hereof. However, for a better understanding of the invention, and the advantages and objectives obtained by its use, reference should be made to the Drawing, and to the accompanying descriptive matter, in which there is described preferred embodiments of the invention.

BRIEF DESCRIPTION OF THE DRAWING

FIG. 6a is an enlarged fragmentary bottom plan view of the load cell of FIG. 6, with the shroud and potting removed.

FIG. 6b is an enlarged fragmentary left side elevational view of the load cell of FIG. 6, with the shroud and potting removed and with the circuit board partially cut away.

FIG. 6c is an enlarged fragmentary top plan view of the load cell of FIG. 6, with the shroud and potting removed.

FIG. 6d is an enlarged fragmentary right side elevational view of the load cell of FIG. 6, with the shroud and potting removed.

FIG. 10 is a partially exploded fragmentary perspective view of an alternate lift truck scale mounting configuration consistent with the invention.

DETAILED DESCRIPTION OF PREFERRED EMBODIMENTS

Figure 1:
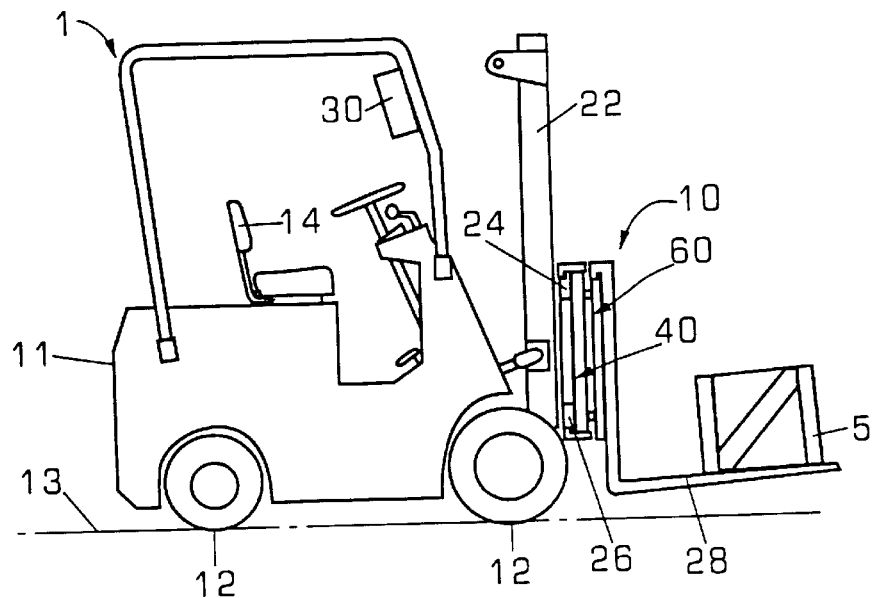
FIG. 1 is a side elevational view of a lift truck showing a preferred lift truck scale consistent with the principles of the invention.
Figure 6:
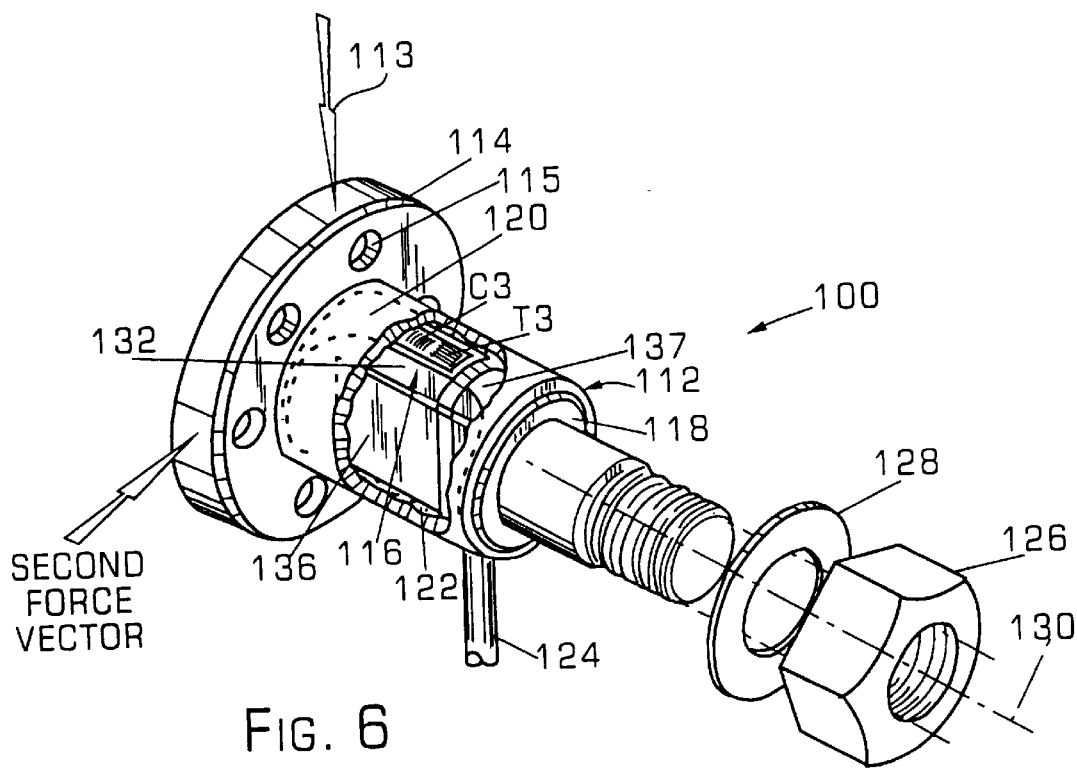
FIG. 6 is a perspective view of one load cell from the lift truck scale of FIG. 1, with a portion of the shroud and potting cut away.

Turning to the Drawing, wherein like numbers denote like parts throughout the several views, FIG. 1 illustrates a lift truck 1 having a lift truck scale 10 consistent with the principles of the invention. Lift truck 1 can be any commercially available lift truck, such as the GCX25 manufactured by Clark. Generally, such a lift truck includes a chassis 11 supported on a ground surface 13 by wheels 12. An operator controls the lift truck while sitting in seat 14, and loads are carried by a pair of forks 28 which are supported by crossbars 24 and 26. Forks 28 each include a portion 28a which extends generally perpendicular to the outer surfaces of the crossbars to support one or more objects thereon. Crossbars 24 and 26 are raised and lowered on a pair of vertical supports 22, thereby permitting objects such as box 5 to be lifted and transported by lift truck 1.

Lift truck scale 10 is generally oriented between crossbars 24 and 26 and forks 28 to provide a weight measurement of objects lifted by the truck. Operator interface and display of the weight measurement is handled through a controller 30 which is oriented on the lift truck for convenient access by the truck operator.

The preferred scale and load cells for use therewith are particularly well suited for use as a lift truck scale for fork lifts and the like. However, it will be appreciated by one skilled in the art that the principles of the invention may apply to other weighing and force sensing applications. Accordingly, the discussion herein in the context of a lift truck scale should not be construed as limiting the invention solely to such applications.

The preferred scale 10 includes a new dual sensor load cell which rejects residual rejected effects from the output signal of the load cell. In addition, the preferred scale uses a plurality of load cells which are connected in such a manner that frictional effects are rejected from the output of the scale, and such that the output of the scale is substantially insensitive to the position of objects on the scale. A brief discussion of the principles of operation for each of these aspects will be provided prior to discussing the preferred embodiments of the invention.

Principles of Operation
Conventional Scale Function

When more than one load cell was used in a conventional scale, the load cells supported the load in parallel. This meant that the total of all of the vertical (load) forces on the scale would have to be equal to the weight applied to the scale for the scale to be accurate.

$$W = \sum_{i=1}^{N} F_i$$

Where W was the applied weight, and $F_i$ was the vertical force applied to the $i^{th}$ load cell, which was one of N load cells supporting the load on the scale. For example, in an accurate scale with four load cells, the total weight applied to the scale would be represented by the equation:

$$W = F_1 + F_2 + F_3 + F_4$$

These forces can be represented by an output from each load cell $S_i$, which contribute a signal which was exactly proportional to the vertical force applied to the load cell. Where $a_i$ is the proportionality factor between the signal and the vertical force.

$$S_i = a_i \cdot F_i$$

Figure 2:
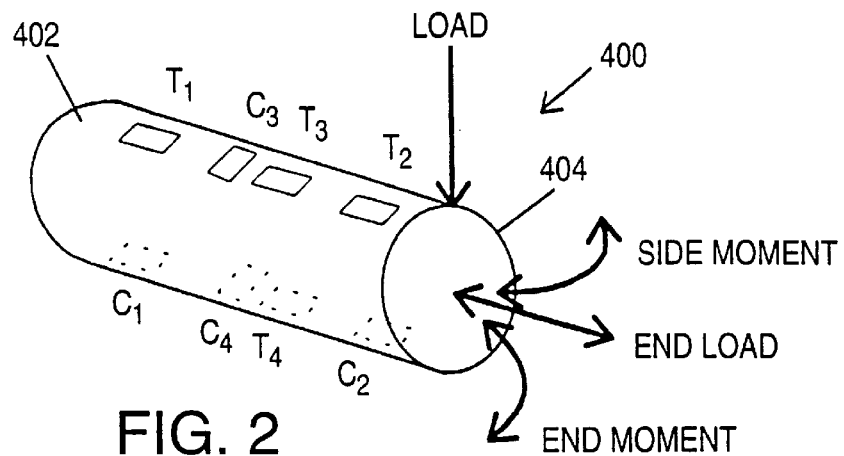
FIG. 2 is a functional perspective view of a load cell illustrating typical effects exhibited thereupon, and showing the placement of sensors on the load cell consistent with the invention.
Figure 3:
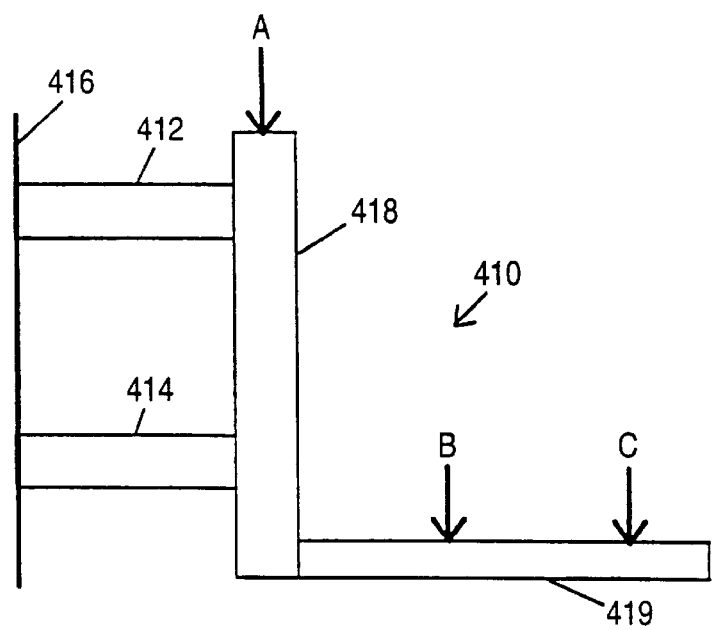
FIG. 3 is a functional perspective view of a scale mounting configuration for illustrating typical effects exhibited thereupon.

For the scale to be accurate when the load was placed anywhere on the scale and for any load transfer between the load cells, these proportionality factors for each load cell would have to be determined accurately. This was usually done by applying a known weight at a number of locations on the scale preferably at locations where most of the weight was borne by only one of the load cells at a time. These proportionality factors were implemented by storing numbers representing them in a digital load cell scale where they were used in the weight calculation or by adjustments in some elements within the analog connections of an analog load cell scale where they effected the analog signals. The assumption was made that the only output from these load cells was from the vertical force alone. This was correct if only vertical forces were allowed to be applied to the load cells or if the load cells were perfect in their ability to sense only the vertical force component of the forces applied to them. This was not always the case and some output signal may have been due to other than a vertical force being applied to the load cell. For example, FIG. 2 illustrates a load cell 400 having a fixed end 402 and a cantilevered end 404 to which a vertical load is applied. Other load effects, e.g. side moments, end loads, and end moments are also shown. As shown in FIG. 3, a lift truck scale 410 includes a vertical member 418 joined to a fixed member 416 through load cells 412 and 414. The non-load effects experienced by these load cells will vary, e.g. based upon the position of a load such as at points B and C on forks 419 (which are horizontally offset from the connection point A to the load cells).

The non-load effects may be due to deflection of the load cell or its attachments, or the changes in location of the applied weight, or both, or some horizontal force exerted on the scale from an attachment to the scale. In any case this load cell would then have an output which was due to the influence of the sum $S_i$, of the forces applied to it.

$$S_i = a_i \cdot \sum_{j=1}^{m} F_{i,j}$$

Where m indicates the number of different forces on a load cell including the vertical load force and any non-load forces. The vertical force on load cell number one may be represented by $F_{1,1}$, the horizontal force in the axial direction by $F_{1,2}$, the horizontal force perpendicular to the load cell axis by $F_{1,3}$, the force effect due to a bending moment about the vertical to the load cell by $F_{1,4}$, etc. Any effect due to the applied load which causes the load cell to have output may be included in this summation. Each of the load cells in the scale will have its own summation of force effects.

$$S_1 = a_1 \cdot \sum_{j=1}^{m} F_{1,j}$$

$$S_2 = a_2 \cdot \sum_{j=1}^{m} F_{2,j}$$

$$S_3 = a_3 \cdot \sum_{j=1}^{m} F_{3,j}$$

$$S_4 = a_4 \cdot \sum_{j=1}^{m} F_{4,j}$$

Where:

$$S_1 = a_1 \cdot F_{1,1} + a_1 \cdot F_{1,2} + a_1 \cdot F_{1,3} +$$
$$a_1 \cdot F_{1,4} + a_1 \cdot F_{1,5} + \ldots a_1 \cdot F_{1,m}$$

and $$W = F_{1,1} + F_{2,1} + F_{3,1} + F_{4,1}.$$

The proportionality was adjusted on this summed output and not just on the vertical force effect output, since there was no way to determine the individual force effects. When the load shifts from one load cell to another due to slippage in the attachment joints or some other type of movement, the vertical force may have changed on the load cell but some of the other forces may not, or at least not in the same proportion. The scale would only be accurate if the other load cells which also had vertical load shift to or away from them, also had the same vertical force proportions as this load cell. Otherwise the total output would not be equal to the applied load, and an incorrect scale reading would be experienced. This change in vertical force also would cause a change in other load cell force effects, which would have different proportions than the vertical forces. These forces would then contribute to inaccurate representation of the applied load. When the proportions of the vertical forces were adjusted the others were also. This presents a problem since for good scale performance the total of the vertical forces sensed must be equal to the applied load while the total of the other forces sensed must be zero.

Undesired Force Effect Cancellation

For only one non-force effect of significance (besides the desired vertical force effect), the equations for the vertical force effects are:

$$F_{i,1} = \frac{S_i}{a_i} - F_{i,2}$$

and for the total weight is $$W = \sum_{i}^{N} \frac{S_i}{a_i} + \sum_{i}^{N} F_{i,2}$$

For this weight reading to be independent of the non-load force effects:

$$\sum_{i}^{N} F_{i,2} = 0.$$

This non-load force effect sensitivity may not be the same in all of the transducers. So, if these forces are due to internal deformation or movement within the scale assembly, this condition will not be met unless the effects are proportioned so that the summation is made to be zero. Since the vertical force effect proportions must be maintained for insensitivity to the load position and for load transfer between load cells, additional signals are required representing this non-load force effect which may then be independently proportioned and added to the output, allowing adjustments to cancel these residual undesired non-load effects on the signal.

To provide this cancellation signal, a sensor circuit substantially independent of the vertical load effect must be used, which has an output predominately due to and adjustable for each undesired non-load effect to be rejected. This independent signal is then proportioned and added to the vertical load sensing output, as required, to eliminate the non-vertical force effects on the total output.

The corrected weight representation would in general be described by the equation:

$$W = \sum_{i=1}^{N} \frac{S_i}{a_i} + \sum_{i=1}^{N} \sum_{j=2}^{m} F_{i,j} + \sum_{k=1}^{K} \frac{s_k}{b_k}$$

Where the additional signals are $S_k$ and their proportioning factors are $b_k$. These proportioning factors could of course be stored as numbers in a digital system or in the adjustments of elements in an analog circuit in an analog system. The proportioning factors are determined by applying the load or force effects several different ways so as to maximize the output of each of the trim sensors more than the others each time. The adjustments of the proportioning factors are made so that the effects of the residual undesired load effect is minimized or cancelled. This may be done using mathematical linear solutions and test data and determining the cancellation factors or by adjusting analog elements.

The individual load cells which are to be used in the scale may also be adjusted to have minimal sensitivity to particular undesired load effects by having the undesired effects sensed in isolated auxiliary sensing elements on each load cell. The output of these isolated sensors can then be proportioned and added to the load cells output so as to minimize the effect of these undesired load effects.

Figure 4A:
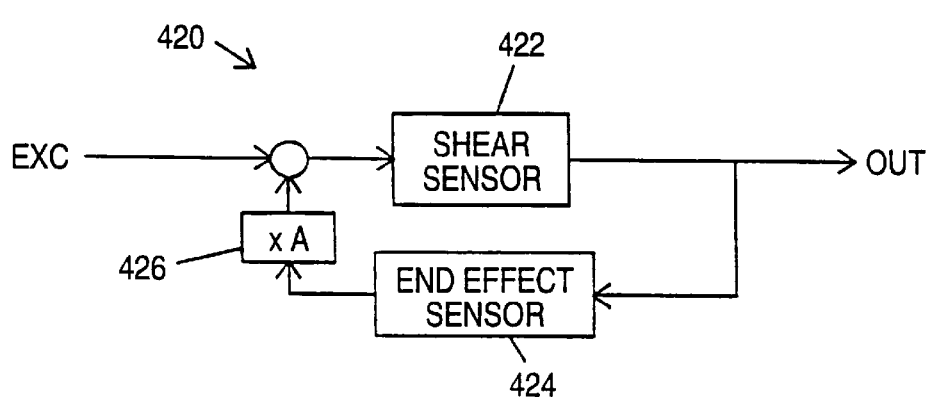
FIG. 4a is a functional block diagram illustrating the operation of a preferred dual sensor load cell consistent with the invention.

For example, FIG. 4a illustrates this dual sensing capability for a load cell 420 having a shear sensor 422 for sensing the vertical load, and an end effect sensor 424 for sensing the non-load effect. The shear sensor 422 may correspond, for example, to a wheatstone bridge connection of tension sensors (e.g. strain gauges) $T_1$ and $T_2$ and compression sensors $C_1$ and $C_2$ as shown in load cell 400 of FIG. 2. The end effect sensor 424 may correspond to a wheatstone bridge connection of tension sensors $T_3$ and $T_4$ and compression sensors $C_3$ and $C_4$. By arranging the tension and compression sensors in different electrical connections, the end effect sensor may sense end loads or end moments as desired.

When strain gauges are used for the sensors, an excitation signal must be provided thereto. Accordingly, as shown in FIG. 4a, end effect sensor 424 may be used as a feedback mechanism, proportioned in block 426, to scale the output of the shear sensor 422.

Thus, the added auxiliary sensor outputs are proportioned so that they cancel the residual undesired force effects.

$$\sum_{i=1}^{N} \sum_{j=2}^{m} F_{i,j} + \sum_{k=1}^{K} \frac{s_k}{b_k} = 0$$

Figure 4B:
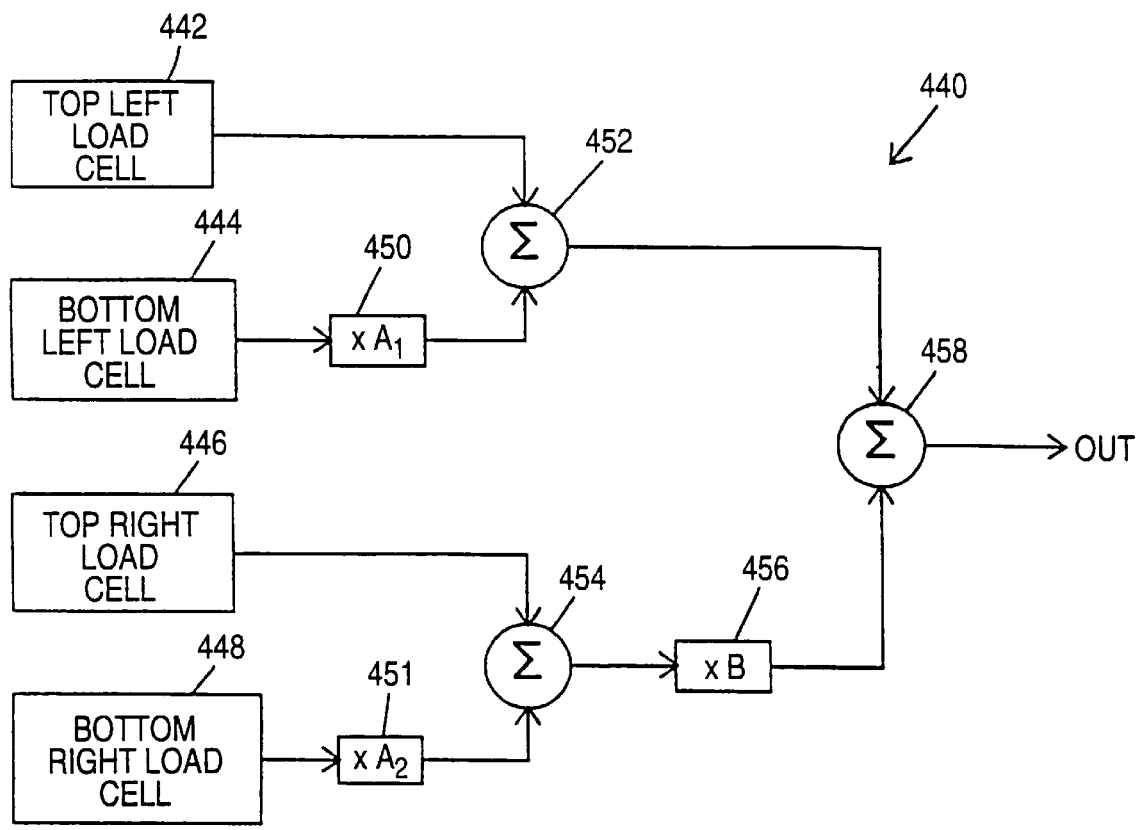
FIG. 4b is a functional block diagram illustrating cornering correction in a preferred scale consistent with the invention.

When the load cells require adjustment while mounted in a multi-load cell scale, an adjustment-connection box may be used to minimize or cancel the undesired force effects, e.g. as shown in FIG. 4b. Here, a scale 440 includes four load cells 442, 444, 446 and 448, coupled through summers 452, 454 and 458, and scaled by multipliers 450, 451 and 456. By applying a load at different points on the scale, both the individual load cell sensor outputs, as well as the scale multipliers, may be adjusted to correct for undesired non-load effects and to make the scale insensitive to load position.

Frictional Effect Cancellation

Utility may also be gained when more than one load cell supports a portion of a total load at a single point on a plane orthogonal to the load vector, e.g., in the orientation of load cells 412 and 414 in FIG. 3.

The sum of the outputs from the load cells supporting the load at one point will represent the output for that point.

$$S_i = \sum_{k=1}^{K} S_{i,k} = F_i \cdot \sum_{k=1}^{K} a_k$$

Where i represents the number of one point supports connected to the platform, k represents one of K load cells supporting that point, $S_i$ represents the composite output of the load cells supporting the load force $F_i$ at point supports connected to the platform, $S_{i,k}$ represents the individual load cell output signals and $a_k$ represents the proportion each load cell supports of the force $F_i$.

Since the sum of the individual forces on the load cells in a multi load cell scale must be equal to the total load force applied to the scale, any movement of the load within the load cells will not effect that total. If, however, the load cells do not have equal sensitivity to the load, the total output signal from the load cells may change due to redistribution of the load force applied. If the load cells are also sensitive to non-load forces, some of the output signal from the load cells may be due to these non-load forces as well.

$$S_{i,k} = a_{i,k} \cdot F_{i,1} + \sum_{j=2}^{m} b_{i,k,j} \cdot F_{i,j}$$

The total of all of the load cell outputs may not always be equal to the same proportional relationship to the total applied load unless non-load force effects on the outputs and the effects of redistribution cancel.

$$S_i = a_i \cdot F_{i,1} = \sum_{k=1}^{K} \left( a_{i,k} \cdot F_{i,1} + \sum_{j=2}^{m} b_{i,k,j} \cdot F_{i,j} \right)$$

The proportionality factors $a_i$ are constant and cannot change for a scale to be accurate. This means that the sensitivity of these constants to any change in any of the variables: $a_{i,k}$ (proportional load share), $F_{i,1}$ (load force) or $F_{i,j}$ (non-load force), x and y (load position), X (fork position), and t (time) must be zero.

More specifically, with load cells 412 and 414 of FIG. 3, there are only two composite outputs, $S_1$ and $S_2$, where each is the result of the output from only two load cells.

$$S_1 = a_1 \cdot F_{1,1} = (a_{1,1} + a_{1,2}) \cdot F_{1,1} + (b_{1,1,2} - b_{1,2,2}) \cdot F_{1,2}$$

and $$S_2 = a_2 \cdot F_{2,1} = (a_{2,1} + a_{2,2}) \cdot F_{2,1} + (b_{2,1,2} - b_{2,2,2}) \cdot F_{2,2}$$

Where the weight on the scale W is represented by the sum of the composite outputs.

$$W = F_{1,1} + F_{2,1}$$

The load forces $F_{1,1}$ and $F_{2,1}$ may be related to x, the horizontal load position parallel to the load cell support plane, where R is the horizontal distance between the composite load cell supports.

$$F_{1,1} = W \cdot \left(1 - \frac{x}{R}\right) \text{ and } F_{2,1} = W \cdot \frac{x}{R}$$

The non-load forces $F_{1,2}$ and $F_{2,2}$ may be related to y, the horizontal load position from the load cell support plane and, H, the vertical distance between the load cells in each composite load cell and the fork positions $X_1$ and $X_2$, horizontal positions parallel to the load cell support plane.

$$F_{1,2} = F_{1,1} \cdot \left(\frac{y}{H} + c_{1,1} \cdot X_1 + c_{1,2} \cdot X_2\right)$$

and $$F_{2,2} = F_{2,1} \cdot \left(\frac{y}{H} + c_{2,1} \cdot X_1 + c_{2,2} \cdot X_2\right)$$

Without additional sensor inputs as in the dual force sensing load cell the sensitivity to the x, y load position may be eliminated by proper adjustment of the $a_{i,j}$ load share factors by span adjustment of the individual load cell outputs. Otherwise, with some sensitivity to load position allowed, the sensitivity to fork position may be eliminated by proper adjustment of the $a_{i,j}$ load share factors by span adjustment of the individual load cell outputs.

The load share factors $a_{i,j}$ may change as the load shifts over time. This would present itself in the individual load cell as anelastic creep. Under these conditions the individual load cell output signals would not be stable. This presents time dependent factors.

$$S_1 = [a_{1,1} \cdot (\alpha_{1,1} + \beta_{1,1} \cdot t + \gamma_{1,1} \cdot t^2 + \ldots) + a_{1,2} \cdot (\alpha_{1,2} + \beta_{1,2} \cdot t + \gamma_{1,2} \cdot t^2 + \ldots)] \cdot F_{1,1}$$

and $$S_2 = [a_{2,1} \cdot (\alpha_{2,1} + \beta_{2,1} \cdot t + \gamma_{2,1} \cdot t^2 + \ldots) + a_{2,2} \cdot (\alpha_{2,2} + \beta_{2,2} \cdot t + \gamma_{2,2} \cdot t^2 + \ldots)] \cdot F_{2,1}$$

These time dependent factors may be cancelled from the composite load cell output by properly adjusting the load share factors so that the dependency factors cancel.

$$a_{1,1} \cdot (\beta_{1,1} \cdot t + \gamma_{1,1} \cdot t^2 + \ldots) + a_{1,2} \cdot (\beta_{1,2} \cdot t + \gamma_{1,2} \cdot t^2 + \ldots) 0$$

and $$a_{2,1} \cdot (\beta_{2,1} \cdot t + \gamma_{2,1} \cdot t^2 + \ldots) + a_{2,2} \cdot (\beta_{2,2} \cdot t + \gamma_{2,2} \cdot t^2 + \ldots) 0$$

When load share factors $a_{a,j}$ change with load cycling, the static friction prevents the increasing force from matching the decreasing forces. This would present itself in the individual load cell as static hysteresis. Under these conditions the individual load cell output signals would not repeat their values when the load cycle is reversed. This presents load change dependent factors.

$$S_1 = [a_{1,1} \cdot (\alpha_{1,1} + \mu_{1,1} \cdot \Delta F_{1,1} + \sigma_{1,1} \cdot \Delta F_{1,1}^2 + \ldots) + a_{1,2} \cdot (\alpha_{1,2} + \mu_{1,2} \cdot \Delta F_{1,1} + \sigma_{1,2} \cdot \Delta F_{1,1}^2 + \ldots)] \cdot F_{1,1}$$

and $$S_2 = [a_{2,1} \cdot (\alpha_{2,1} + \mu_{2,1} \cdot \Delta F_{2,1} + \sigma_{2,1} \cdot \Delta F_{2,1}^2 + \ldots) + a_{2,2} \cdot (\alpha_{2,2} + \mu_{2,2} \cdot \Delta F_{2,1} + \sigma_{2,2} \cdot \Delta F_{2,1}^2 + \ldots)] \cdot F_{2,1}$$

These load change dependent factors may be cancelled from the composite load cell output by properly adjusting the load share factors so that the dependency factors cancel.

$$a_{1,1} \cdot (\alpha_{1,1} + \mu_{1,1} \cdot \Delta F_{1,1} + \sigma_{1,1} \cdot \Delta F_{1,1}^2 + \ldots) + a_{1,2} \cdot (\alpha_{1,2} + \mu_{1,2} \cdot F_{1,1} + \sigma_{1,2} \cdot \Delta F_{1,1}^2 + \ldots) 0$$

and $$a_{2,1} \cdot (\alpha_{2,1} \cdot \Delta F_{2,1} + \sigma_{2,1} \cdot \Delta F_{2,1}^2 + \ldots) + a_{2,2} \cdot (\alpha_{2,2} + \mu_{2,2} \cdot \Delta F_{2,1} + \sigma_{2,2} \cdot \Delta F_{2,1}^2 + \ldots)0$$

Figure 4C:
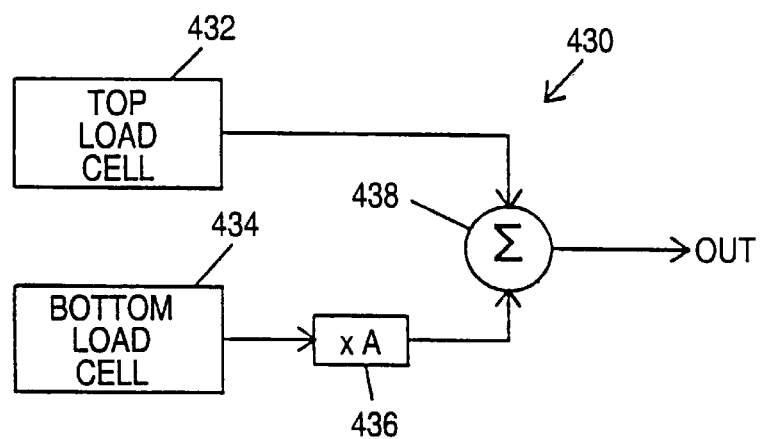
FIG. 4c is a functional block diagram illustrating frictional effect rejection in a preferred scale consistent with the invention.

The operation of this type of scale is illustrated in FIG. 4c, where a scale 430 includes top and bottom load cells 432 and 434 summed at 438, with one output scaled via block 436. Of course, in the scale shown in this FIG., as well as the load cells and scale of FIGS. 4a and 4b, may providing scaling by scaling either, or both signals prior to their summations.

Tiltable Scale

It has been found that a tiltable or portable scale may also be produced which weighs accurately when tilted consistent with the invention. This scale includes at least one tilt sensor and electronic circuits with the ability to process the signals from a tilt sensor and a load sensor. The load sensor may contain any number of force sensors as required to support the load on the load support from the base. The electronic circuits process the signals from the force sensors and tilt sensors and provide the correct signal relative to the weight applied to the scale, independent of the effects of tilting the scale from its level state.

It is known that, if uncompensated, tilting scales cause variations of the force perpendicular to the load support plane, and stationary scales must be level to weigh accurately. If the angle of tilt is known the force on the scale's load support may be predicted as a function of this angle. This prediction may then be used to calculate the weight.

$$W = \frac{F_1}{\cos\theta} \text{ and } S = A_1 \cdot W \cdot \cos\theta$$

Here the force perpendicular to the scale support plane, sensed by the directionally sensitive load sensor, is $F_1$ the tilt angle is $\Theta$, the load sensor output signal is S, and the force sensitivity factor for loads perpendicular to the plane of the load support is $A_1$.

If the scale may tip about more than one axis of tilt, a tilt sensor with more than one axis of tilt sensitivity is required or two tilt sensors are required. When the tilt sensors are oriented perpendicular to one another, the effect of the angle, $\Theta$, is a function of the two angles sensed, $\phi_1$ and $\phi_2$.

$$W = F_1 \cdot \sqrt{1 + \tan^2\phi_1 + \tan^2\phi_2}$$

If the load sensor is sensitive to forces which are not perpendicular to its support plane, another variation in the scale signal may be detected, where $A_2$ and $A_3$ are force sensitivity factors of the load sensor to forces tangent to the load support plane.

$$S = A_1 \cdot W \cdot \cos\Theta + A_2 \cdot W \cdot \sin\phi_1 + A_3 \cdot W \cdot \sin\phi_2$$

This may be the case when a dual force sensor load cell is used in a scale or the load cell used has sensitivity to forces tangent to the scale load support plane. It may be shown that the influence of these tangent sensitivities may be represented by phase shifts $\delta_1$ and $\delta_2$ in the angle sensor inputs and altered sensitivity factor $A_4$.

$$W = \frac{S}{A_4} \cdot \sqrt{1 + \tan^2(\phi_1 + \delta_1) + \tan^2(\phi_2 + \delta_2)}$$

If the load sensor provides separate force sensitivity outputs in two directions not in line with the primary force sensitivity direction, these outputs may be used to determine the angles of tilt and be used as angle sensors. When the two force sensitivity directions are orthogonal to the primary and each other they define a coordinate system and may be used directly to measure the applied force independent of the angle of tilt.

$$W = \sqrt{F_1^2 + F_2^2 + F_3^2}$$

where the forces are measured by calibrating the individual force outputs. The angles of tilt may be determined:

$$\phi_1 = \tan^{-1}\frac{F_2}{F_1} \text{ and } \phi_2 = \tan^{-1}\frac{F_3}{F_1}$$

Mechanical Configuration

Figure 5:
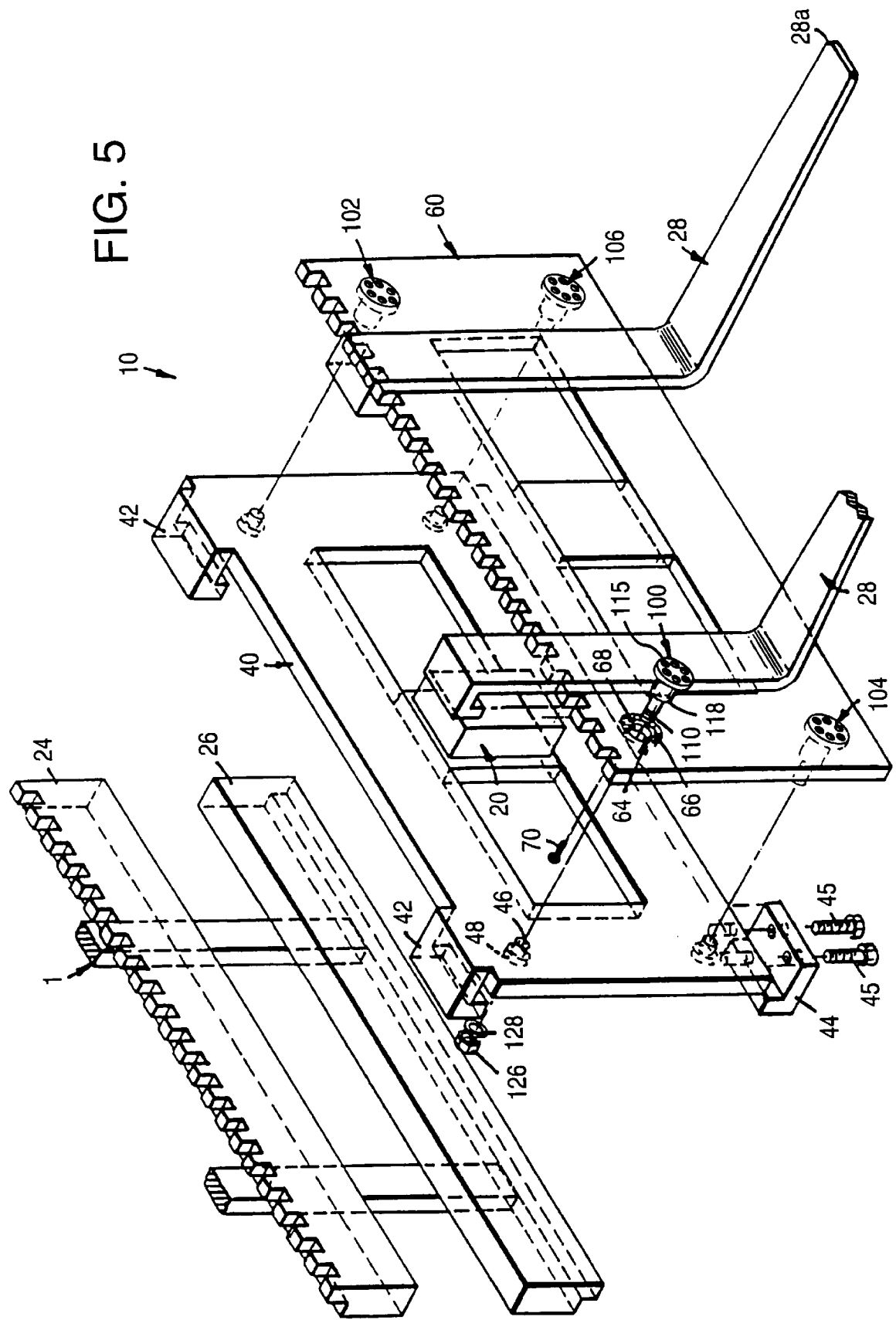
FIG. 5 is a partially exploded fragmentary perspective view of the lift truck scale of FIG. 1.

The mechanical components of the preferred lift truck scale 10 are illustrated in FIG. 5. It is preferable to design scale 10 such that it is easy to install and remove from a standard lift truck without substantial modification to the truck. In the preferred embodiment, the scale simply hangs off of the existing crossbars 24, 26 of the truck in the same manner as standard forks. No other modification to the lift truck, other than installation of the housing for controller 30, routing of wires between the scale and the controller, and connecting the controller to the battery of the lift truck, is typically required.

As shown in FIG. 5, the crossbars 24, 26 on lift truck 1 are laterally extending and vertically spaced from one another. Crossbar 24 has a plurality of notches on its top surface for receiving forks 28 at operator-selected widths. Lift truck scale 10 includes first and second vertically oriented mounting plates 40 and 60 which are interposed between the crossbars and forks of a standard lift truck, and are coupled through a plurality of load cells 100, 102, 104 and 106.

First plate 40 operates as the base of the scale and includes a pair of hooks 42 which engage crossbar 24 such that plate 40 is supported by the crossbar. A pair of removable hooks 44 bolt onto the underside of plate 40 with bolts 45 to fix the plate on crossbar 26 in a secure manner. Installation and removal of scale 10 to or from the lift truck is relatively simple, since only the attachment or detachment of removable hooks 44 to or from plate 40 is generally required.

Second plate 60 is mounted to first plate 40 through load cells 100, 102, 104 and 106. Second plate 60 includes notches on its top surface similar to those on crossbar 24, thereby enabling forks 28 to be installed thereupon at a plurality of lateral positions similar to the manner in which they may be installed on the crossbar of a conventional lift truck. Second plate 60 and forks 28 form the force receiving member or structure for scale 10 since it is this structure which applies the force from an object support by the forks across the load cells for weighing. However, it will be appreciated that in different applications, the base and force receiving structure may vary consistent with the application. For example, for truck or platform-type scales, the force receiving structure will typically be a horizontal platform, while the base will be a housing or other structure upon which the load cells are mounted.

A junction box 20 is mounted to plate 40 facing plate 60 and is protected behind a cover attached to plate 60. Junction box 20 houses the load cell driver 200 and the tilt sensors 304, 306, which are described below in conjunction with FIG. 7. Junction box 20 is preferably a weather resistant housing to protect the electrical circuitry housed therein from the environment.

Load cells 100, 102, 104 and 106 are oriented generally perpendicular to the plates and are disposed in two laterally spaced vertical columns. When viewed from the front of the scale, load cell 100 is a top left load cell, load cell 102 is a top right load cell, load cell 104 is a bottom left load cell, and load cell 106 is a bottom right load cell.

Load cell 100, which is also exemplary of load cells 102, 104 and 106, is shown in FIGS. 6 and 6a–d. Load cell 100 generally includes a threaded shank 110, a sensor section 112 and a flange 114. Shank 110 defines a neutral or longitudinal axis 130 for the load cell, and it includes a ring 118 which acts as a stop when the load cell is installed on plate 40. A nut 126 and washer 128 are used to secure the load cell to plate 40, as will be discussed below. In addition, load cell 100 includes a flange 114 which is generally orthogonal to the longitudinal axis 130 of shank 110 and is adapted to mount to plate 60 using a plurality of bolts 70 secured through apertures 68 into threaded holes 115 (shown in FIG. 5).

Sensor section 112 is disposed between stop 118 and flange 114. This section includes a deformable member 116 which is designed to deform or deflect in response to a force applied along a first, desired force vector, which in this case is a vertically oriented force due to gravity designated by arrow 113. Deformable member 116 is also designed to reject at least some of the forces applied on other force vectors, thereby substantially isolating the desired forces to be sensed. The deformable member is milled or otherwise formed with a narrowed portion defining a pair of opposing planar side surfaces 132, 134, whereby a vertical force applied in a direction parallel to the surfaces (i.e., along arrow 113) will introduce a measurable shear across the sensor section of the load cell. Top and bottom surfaces 137, 138 are oriented generally orthogonal to the side surfaces 132, 134.

The body of load cell 100 is preferably formed of tool steel. Other suitable materials used for load cells and the like, including other metals, metal alloys, composite materials, etc. may also be used.

A first force sensor 140 is mounted in sensor section 112 to measure the shear forces applied to deformable member 116 by a vertical load. Force sensor 140 in the preferred embodiment includes four force transducers, preferably strain gauges T1, T2, C1 and C2, which are connected in a wheatstone bridge configuration. Two of the strain gauges T1, T2 are placed in tension by an applied force, and the other gauges C1, C2 are placed in compression.

The strain gauges are of the type which operate by varying in resistance in response to a strain applied to the gauge. For example, one suitable strain gauge is the constantan polyimide strain gauge manufactured by Micro Measurements. The strain gauges typically provide a resistance which varies in the range of 120 to 5000 Ω. Other commercially available strain gauges may also be used in the alternative.

The strain gauges in sensor 140 are preferably matched to minimize any span differences therebetween. In addition, the strain gauges are oriented on the deformable member 116 to be responsive primarily to the shear forces applied along the first force vector 113. Tension gauges T1 and T2 are oriented on the opposing planar surfaces 132, 134, and are tilted 45° from the neutral axis 130 such that they are placed in tension in response to shear forces. Compression gauges C1 and C2 are also disposed on planar surfaces 132 and 134, but are oriented 90° from the tension gauges such that they are placed in compression in response to the shear forces.

In this configuration, when the strain gauges are connected in a wheatstone bridge configuration (discussed in greater detail below), the output of the bridge circuit will be primarily responsive to force along the desired force vector 113, with other forces being significantly rejected from the output. However, due to errors as a result of machining tolerances, strain gauge mismatches, mounting imperfections, etc., other forces, designated "residual rejected effects" will still typically affect the output of first sensor 140. Accordingly, a second force sensor 150 is also included on load cell 100 to isolate and measure one or more of these residual rejected effects.

In the preferred embodiment, second force sensor 150 includes four additional strain gauges T3, T4, C3 and C4 also connected in a wheatstone bridge circuit. The gauges in sensor 150 are preferably matched with one another, and may be also matched with those in sensor 140.

Strain gauges T3 and T4 are oriented to be placed in tension and strain gauges C3 and C4 are oriented to be placed in compression as a result of non-load force effects on one or more force vectors other than vector 113. For example, as shown in FIGS. 6a and 6c, gauges T3 and T4 are oriented on top and bottom surfaces 137 and 138 of deformable member 116, and are oriented generally along the longitudinal axes thereof. The compression gauges C3 and C4 are also oriented on the top and bottom surfaces, but at 90° from the tension gauges.

Figure 8:
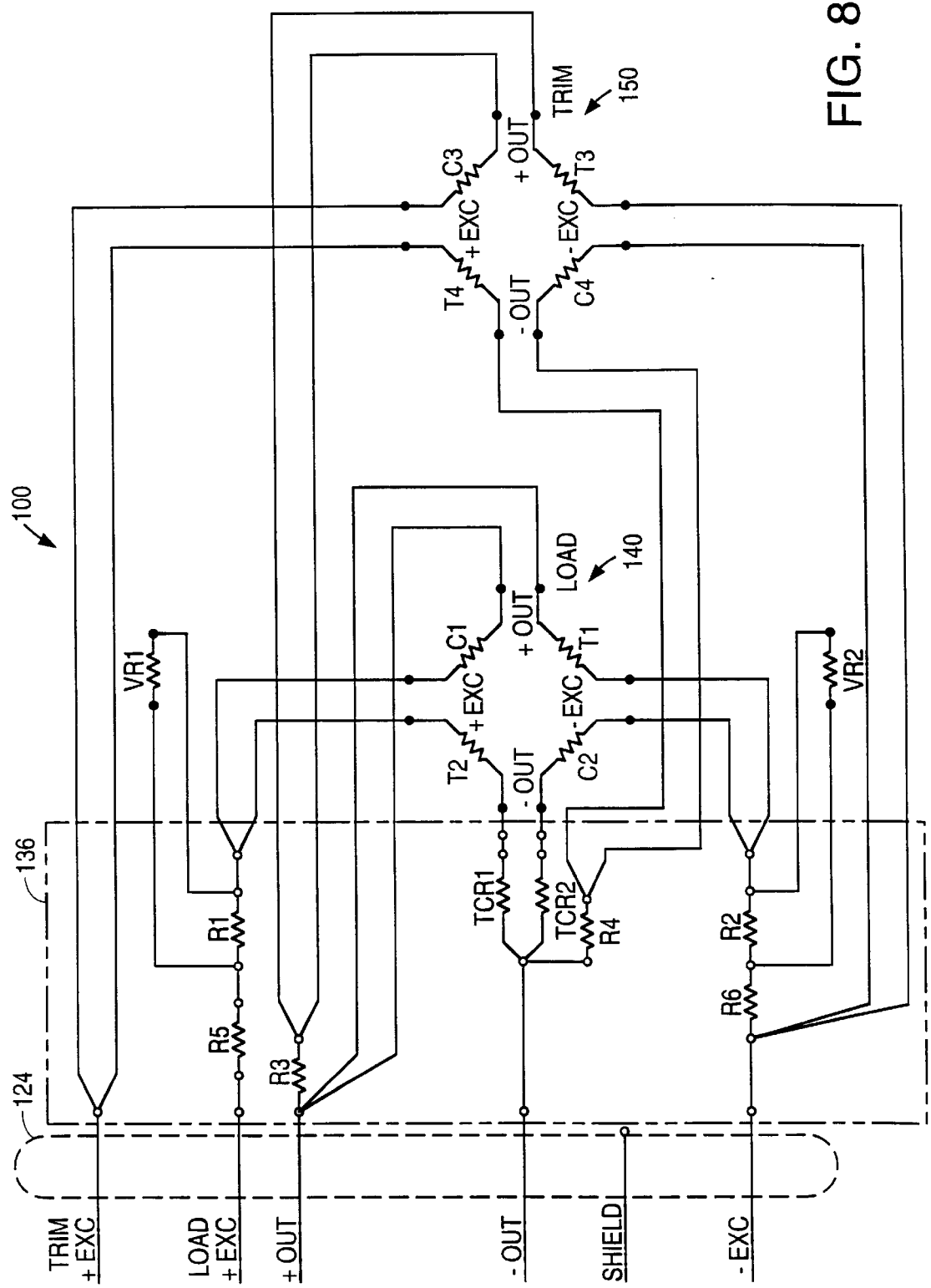
FIG. 8 is a schematic of an electrical circuit for the load cell of FIG. 6.

In the configuration shown for sensors T3, T4, C3 and C4, two different effects may be measured if desired. To measure end loads, which are primarily horizontal forces oriented transverse to the first force vector, the gauges in sensor 150 may be arranged in a wheatstone bridge configuration as shown in FIG. 8. Alternatively, to measure end moments (see FIG. 2), gauges C4 and T4 may be switched in the wheatstone bridge circuit to measure these effects instead.

It will also be appreciated that additional sensors may be disposed on the load cell to measure more than one effect along more than one force vector. Moreover, the secondary sensors may also be disposed on other structures in the scale, for example on separate flexures connecting the two plates. However, in the preferred embodiment the secondary sensors are disposed on the same member as the primary force sensors.

Several other components are mounted to load cell 100. For example, a circuit board 136 is mounted generally parallel and offset to the planar surfaces 132. The circuitry found on this board is discussed below in relation to FIG. 8. In addition, a lead wire 124 is mounted to the circuit board and carries signals to and from the load cell. Moreover, a pair of thermistors VR1 and VR2 are mounted to planar surface 132. These thermistors are resistive elements which change in resistance in response to temperature variations. The use of these thermistors will also be discussed below in relation to FIG. 8.

The sensors and other components of load cell 100 are preferably housed within a shroud 120 to protect these elements from the environment. Preferably, a potting material 122, such as polyurethane, is also disposed within shroud 120 to assist in the protection of the- elements of load cell 100 from the environment, and to minimize any temperature variations experienced by the scale.

Returning to FIG. 5, load cells 100, 102, 104 and 106 are mounted between plates 40 and 60 of scale 10. Each load cell is preferably mounted first to second plate 60 by inserting threaded shank 110 through aperture 64 in second plate 60 such that the flange 114 is received in countersunk recess 66. A plurality of bolts 70 then fit into the corresponding apertures 68 and threaded apertures 115 respectively in second plate 60 and flange 114 to secure the load cells to the second plate.

Once the load cells are mounted to plate 60, they may be mounted to first plate 40 by installing threaded shanks 110 through apertures 46 in first plate 40, then securing the threaded shanks by nut 126 and washer 128. Countersunk recesses 48 are provided proximate the apertures 46 on the side facing the crossbars such that nut 126 is flush or recessed with respect to the surface of plate 40.

With the configuration shown herein, plate 40 is engaged on ring 118 of each load cell, and flange 114 is engaged in recess 66 in plate 60. Consequently, the connection between plates 40 and 60 provides a relatively thin profile with minimum separation between the plates. This is important because the greater the thickness of the scale, the more the capacity of the lift truck is decreased due to the greater separation between the forks and the "fulcrum" of the lift truck, typically the front wheels.

Other mounting configurations may be used in the alternative. For example, as an alternative to nuts 126, jamnut tensioners, such as the SJ models manufactured by Super Bolt Inc., may be used. These tensioners include an annular array of tensioning set screws which are tightened after the tensioner is threaded onto shank 110. Tensioners of this type may provide less slippage in the mounting and therefore more perfect loading of the shank.

In addition, the single plate mechanical configuration shown in the aforementioned Bradley patent may also be used as an alternative to the dual plate mechanism disclosed herein. Further, more or less numbers of load cells may be used between the plates, and one or more flexures may also be disposed between the plates to bear some of the load.

As an example, FIG. 10 shows an alternate mechanical coupling which uses only two load cells along with two or four flexures. As shown in this FIG., first and second plates 40' and 60' each include six apertures 46', 64' in two laterally spaced vertical columns. A pair of load cells 100' and 102' are mounted in the center apertures in each vertical column. In addition, four flexures 103 are mounted in the remaining apertures to bear some of the load between the plates. Each flexure has a similar structure to the load cells, particularly in the mounting hardware for the purposes of interchangeability, but does not include any of the sensors or other electrical components. The flexures may be narrowed (i.e., to bring the opposing planar surfaces closer together) such that each flexure bears less of the overall force, thereby attenuating less of the overall force borne by the scale. In addition, the flexures are preferably rotated about 90° from the load cells along their longitudinal axes so that the opposing planar surfaces thereon are basically horizontal to resist any lateral forces.

This type of alternate configuration has the advantage of providing a reduced number of parts, greater part interchangeability, and a reduced cost because of the use of only two load cells. In addition, the use of the flexures may increase the overall capacity of the scale. Further, it is foreseen that the same plates 40' and 60' could be used for two, four, or even six load cell scales without substantial modification, since any unused apertures may be filled with flexures if desired. Consequently, different capacity or accuracy scales could be manufactured using the same basic mechanical components.

Electrical Configuration

Figure 7:
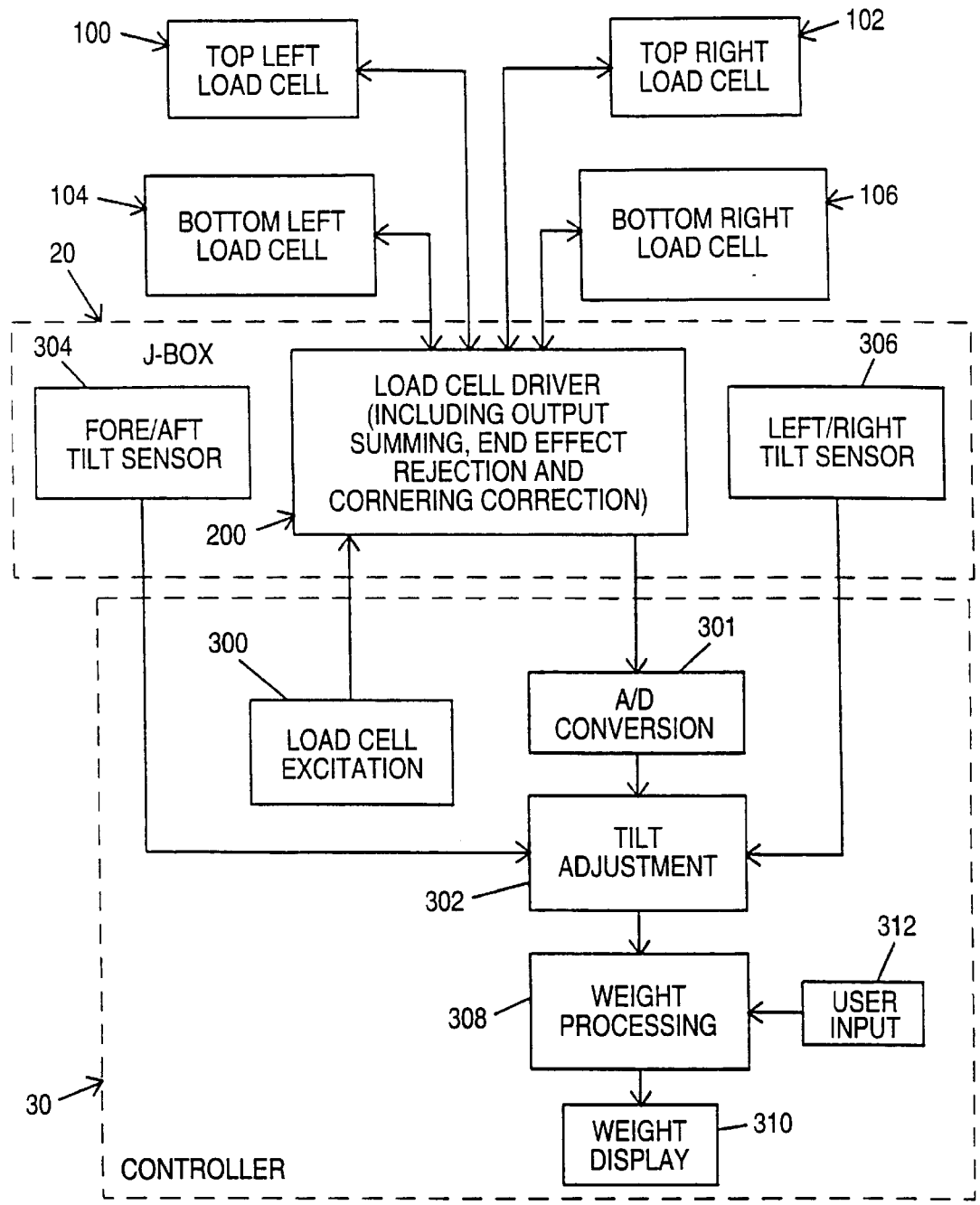
FIG. 7 is a block diagram illustrating the functional components of the lift truck scale of FIG. 1.

The primary electrical components of the preferred lift truck scale 10 are shown functionally in FIG. 7. The scale electronic components are housed in three primary locations. In particular, the circuitry for each load cell 100, 102, 104 and 106 is primarily disposed within the sensor section of each load cell, as described above. The load cell driver 200 is preferably located within junction box 20, along with a pair of tilt sensors 304 and 306 which are used in tilt adjustment. Finally, the higher level processing functions of the scale are performed by controller 30 which is found in a separate housing that is accessible to an operator (e.g., in the position shown in FIG. 1). Controller 30 generally provides the load cell excitation function 300, the tilt adjustment function 302, the weight processing function 308, the user input function 312 and the display function 310.

Load Cell Circuitry

FIG. 8 shows the preferred circuitry for load cell 100. The circuitry for the other load cells is substantially the same. Electrical communication with the load cell is performed through a lead wire 124 which includes a shield line, three input lines (+LOAD EXC, +TRIM EXC, and −EXC), and two output lines (+OUT and −OUT). The shield line is simply tied to the body of the load cell to shield unwanted interference from the other signal lines.

The first sensor 140 is designated the "load sensor" as this sensor is primarily responsive to the load applied to the load cell. Sensor 140 is preferably a resistive network formed by the wheatstone bridge coupling of strain gauges T1, T2, C1 and C2. In addition, a pair of thermistors, TCR1 and TCR2 are optionally included in series with gauges T2 and C2 to provide zero compensation for temperature effects on the output of the bridge. Thermistors TCR1 and TCR2 are of nominal resistance (about 1 Ω), such as no. 34 copper wire manufactured by Micro Measurements.

Second sensor 150 is designated the "trim sensor" as this sensor senses one or more residual rejected effects and "trims" the response of the first sensor to reject these effects from the output of the load cell. Sensor 150 is formed by the wheatstone bridge coupling of strain gauges T3, T4, C3 and C4. As discussed above, this configuration senses primarily end loads oriented transverse to the primary force vector. Optionally, to measure end moments, strain gauges C4 and T4 may be switched in the bridge.

Sensors 140 and 150 each have two input lines (+EXC and −EXC) forming an input for receiving an excitation voltage, and each have two output lines (+OUT and −OUT) forming an output for providing an output signal representative of the force applied to the sensor. Sensors 140 and 150 are generally coupled in parallel, whereby the output of sensor 150 will in effect scale the output of sensor 140 to compensate for residual rejected effects.

The +EXC inputs of sensors 140 and 150 are coupled to two separate excitation signals from lead wire 124. Sensor 140 is coupled to the +LOAD EXC excitation signal through resistor R5 in series with the parallel network of resistor R1 and variable resistor VR1. The −EXC input of sensor 140 is coupled to the −EXC excitation signal in lead wire 124 through resistor R6 in series with the parallel network of resistor R2 and variable resistor VR2.

Resistors R5 and R6 provide span adjustment for the output of the load cell, and they are preferably fixed resistances in the range of 0 to 100 Ω. Fixed resistors R1 and R2 and variable resistors VR1 and VR2 provide temperature compensation means for the load cell such that temperature variations will not affect the span or sensitivity of the load cell. Variable resistors VR1 and VR2 are preferably thermistors, such as bondable nickel resistance elements manufactured by Micro Measurements, with a maximum resistance in the range of 0 to 140 Ω. Fixed resistors R1 and R2 are typically in the range of about 200 Ω.

The +EXC and −EXC inputs of sensor 150 are generally coupled in parallel to sensor 140. The +EXC input of sensor 150 is coupled to a excitation signal +TRIM EXC from lead wire 124, which is separately driven from the load sensor excitation +LOAD EXC in the preferred embodiment to facilitate the rejection of residual rejected effects from the load cell output, as will be discussed below. The −EXC input of sensor 150 is directly coupled to the −EXC input of lead wire 124.

The output signals of sensors 140 and 150 are also coupled in parallel such that the signal present on the outputs of sensor 150 functions to scale the output of sensor 140 in response to residual rejected effects. The +OUT and −OUT inputs of sensor 140 define a first output for the load cell and are directly coupled to the +OUT and −OUT signals of lead line 124. The +OUT and −OUT outputs of sensor 150 define a second output for the load cell and are coupled to the +OUT and −OUT signals of lead line 124 through resistors R3 and R4, respectively. Resistors R3 and R4 are fixed resistors which generally attenuate the output of sensor 150 compared to sensor 140, and will typically have resistances in the range of 5–500 kΩ. The overall output of the load cell, a third output, is formed across lines +OUT and −OUT of lead line 124. This resulting third output across +OUT and −OUT of lead line 124 is responsive to the force sensed by sensor 140, and is compensated for residual rejected effects by the output of sensor 150.

In the preferred embodiment, the residual rejected effects rejection means includes a scaling means for scaling the relative outputs of the first and second sensors 140 and 150. This scaling is preferably performed (1) through selection of resistors R3 and R4, and (2) through controlling the relative magnitudes of the excitation signals +LOAD EXC and +TRIM EXC. Resistors R3 and R4 are preferably fixed, thereby providing a "coarse" adjustment of the outputs. A "fine tuning" of this adjustment is performed by controlling the excitation voltages to each bridge.

As an alternative, resistors R3 and R4 may be variable resistors, with sensors 140 and 150 running off of the same excitation signal. In addition, the scaling may be performed at the excitation voltage, at the outputs, or both (as in the case of the preferred embodiment) to effectuate the rejection of residual rejected effects. The scaling may be performed wholly within the load cell circuitry, or may use additional circuitry (such as circuit 200 as will be discussed below). Further, either sensor 140 or 150, or both, may be scaled to effectuate the relative scaling of the outputs of the sensors. Furthermore, the scaling may be performed by attenuation, (as with the resistors disclosed herein), or through amplification (e.g., using an operational amplifier). In general, any mechanism for scaling the relative sensitivities of the two sensors may be used consistent with the invention.

It will be appreciated that different sensors and circuitry may be used in the preferred load cell consistent with the invention. For example, the strain gauges may be arranged to sense different effects along different force vectors, including end moments, side moments, twisting moments, lateral forces, horizontal forces, etc. In addition, other types of force transducers may be used as alternatives to strain gauges, including various capacitive transducers, resistive transducers, resonating transducers (e.g., tuning forks, vibrating strings, piezoelectric crystals), optical sensors, solid state strain sensors, etc.

In addition, it will be appreciated that scaling of the relative sensitivities of the first and second sensors may be performed through other analog means than described herein, and may also be performed through various digital signal processing algorithms, using various hardware configurations and/or software routines. Such digital manipulation of the signals would be particularly advantageous in the case where digital or resonating transducers were used, since digital signals are inherently less susceptible to errors than analog signals.

Other modifications to the preferred load cell may also be made consistent with the invention.

Load Cell Driver Circuitry

Figure 9:
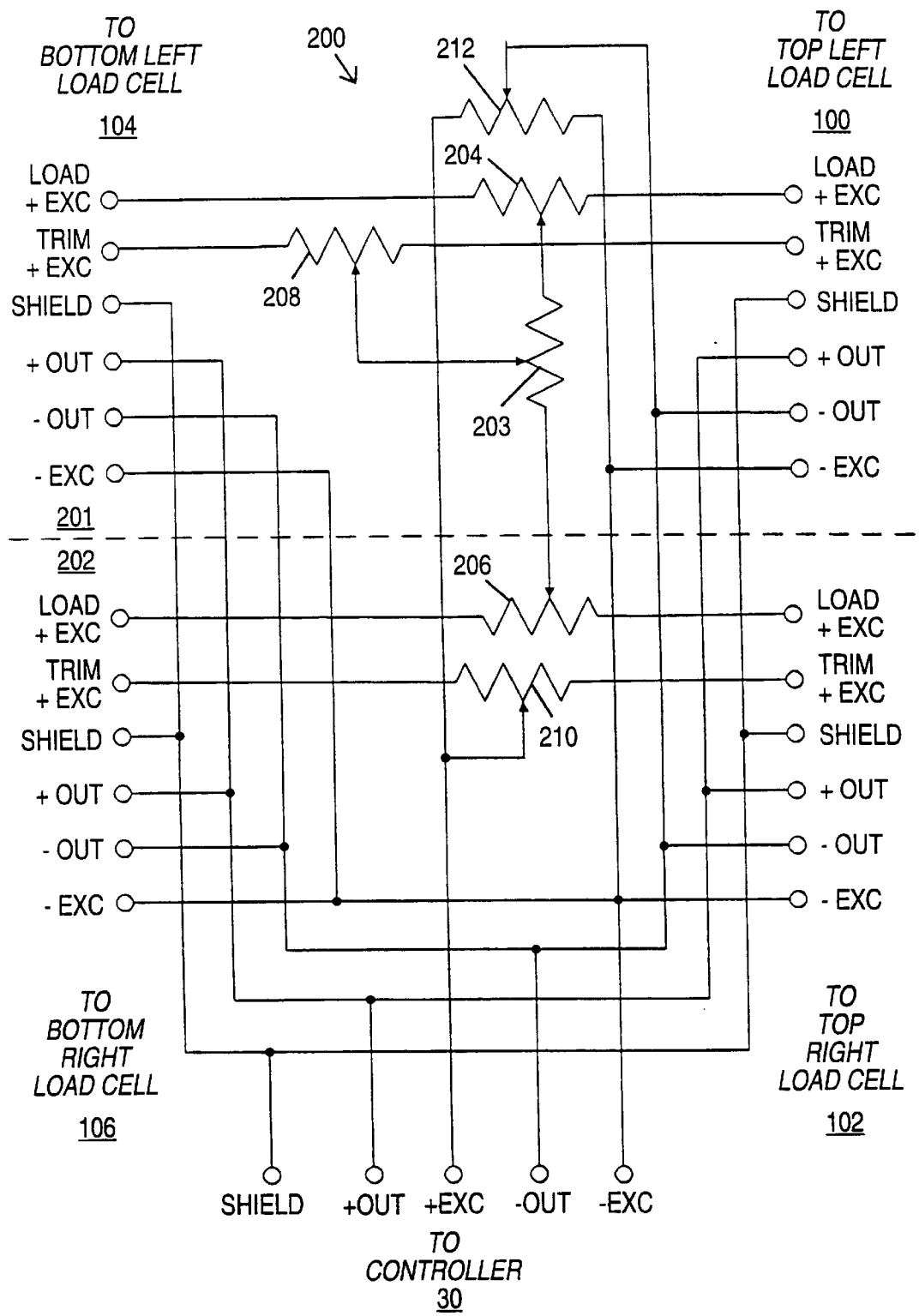
FIG. 9 is a schematic of an electrical circuit for the load cell driver of FIG. 7.

FIG. 9 shows the load cell driver circuit 200 in greater detail. Driver circuit 200 essentially operates as a routing circuit for passing excitation, output and shield signals to and from controllers 30 and each of the load cells 100, 102, 104 and 106. Driver circuit 200 provides a common excitation signal to the load cells, scales the excitation signals to correct for various effects, and returns a common output signal representing generally the sum of the forces sensed by the load cells, corrected for various extraneous effects.

As shown in FIG. 9, the common +EXC signal from controller 30 is used to drive both the load and trim bridges on the load cells through lines +LOAD EXC and +TRIM EXC, respectively. For the load bridges, a potentiometer (variable resistor) 203 is used to apportion the current from the +EXC signal provided by the controller to scale the relative magnitudes of the excitation voltages supplied to the load cells on left and right halves 201, 202 of circuit 200. Left and right circuit halves 201 and 202 correspond respectively to the left and right groups of load cells. Accordingly, potentiometer 203 is designated the left/right balance pot.

A pair of potentiometers 204, 206 are treed off of left/right balance pot 203 in a cascaded arrangement to apportion the current from pot 203 to scale the relative magnitudes of the excitation voltages supplied to the top and bottom load cells on each half of the circuit. Potentiometer 204 scales the excitation voltages of load cells 100 and 104, and is designated the left top/bottom balance pot. Potentiometer 206 scales the excitation voltages of load cells 102 and 106, and is designated the right top/bottom balance pot.

As a result, potentiometers 203, 204 and 206 form a cornering means, or more particularly, an excitation scaling means, for scaling the relative magnitudes of the +LOAD EXC signals of each individual load cell 100, 102, 104 and 106. Alternatively, separate variable resistors could be tied to each +LOAD EXC signal to provide the individual sensitivity adjustment of the signals. However, such a configuration would be more difficult to calibrate than the cascaded group of three potentiometers 203, 204, 206 used in the preferred embodiment.

For the trim bridges of the load cells, a pair of potentiometers 208 and 210 form an input scaling means and are used to apportion the current from the +EXC signal provided by the controller to scale the relative magnitudes of the +TRIM EXC signals provided to the top and bottom load cells on each half 201, 202 of the circuit. Potentiometer 208 scales the +TRIM EXC signals provided to load cells 100 and 104 and is designated the left top/bottom trim pot. Potentiometer 210 scales the +TRIM EXC signals provided to load cells 102 and 106 as is designated the right top/bottom trim pot.

The remaining signal lines in circuit 200, −EXC, +OUT, −OUT, and SHIELD, are routed directly between controller 30 and each of the load cells 100, 102, 104 and 106. The common output signal sent to the controller, across +OUT and −OUT, represents the sum of the scaled individual load cell outputs. However, a zeroing means, potentiometer 212 (designated as the zero pot), is interposed between the +EXC and −EXC signals, and is driven by the −OUT signal from controller 30. Zero adjustment for the scale may be provided by adjusting zero pot 212, which may be beneficial for achieving the maximum usable range when performing analog to digital conversion.

Potentiometers 203, 204, 206, 208, 210 and 212 are preferably multiturn potentiometers having a range of 20 to 500 Ω. Other resistances, however, may be used as required by other designs.

The potentiometers as shown permit the scale to have residual rejected effect rejection, frictional effect rejection and cornering correction for the scale output. However, these potentiometers must be calibrated prior to usage before these advantages are realized by the scale.

To properly calibrate the potentiometers, an operator first must take increasing and decreasing loads at a single position on the scale, and adjust the left and right top/bottom balance pots 204 and 206 such that any hysteresis effects are nulled (i.e., so that an output graph of the increasing loads matches that of the decreasing loads).

Next, an operator applies one load directly over one of the forks (e.g., on the left side) relatively close to plates 40 and 60 (an "aft" position), then applies another load relatively far from the plates (a "fore" position). The left top/bottom trim pot 208 may then be adjusted so that the difference in the outputs is zero.

Next, loads are applied at fore and aft positions on the right side fork, and the right top/bottom trim pot 210 is adjusted to zero the difference in the outputs in the same manner as above for the left side pot.

Next, a load is applied on one side (i.e., proximate one fork) and another load is applied on the other side (i.e. proximate the other fork). The left/right balance pot 203 is then adjusted until the difference in outputs is zero.

Once the balance and trim pots are calibrated, the zero pot 212 may be adjusted to provide a zero output when no external force is applied to the scale. Then, after calibration, the resulting output across the +OUT and –OUT terminals returning to controller 30 will generally be the sum of the outputs of the load cells, corrected for residual rejected effects and frictional effects, and cornered to eliminate any position sensitivity. The resulting output may then be transmitted to controller 30 to perform various scaling and adjustment functions to provide a useful display to the operator of the lift truck.

Various modifications to circuit 200 may be made consistent with the invention. For example, different mechanisms of scaling the excitation signals may be used. In addition, the outputs could be scaled in addition to or in lieu of scaling the excitation signals. Moreover, circuit 200 may be implemented digitally using dedicated hardware, or may be implemented within controller 30 as a separate digital signal processing routine. Other modifications will be apparent to one skilled in the art.

Scale Controller

As discussed above, controller 30 is located at a convenient position for viewing by the operator of the lift truck. Controller 30 provides an overall user interface for controlling the operation of the scale. Each of the primary functions of the preferred controller are illustrated in FIG. 7. However, the actual hardware components and software routines necessary to execute these functions are not discussed, as many of the functions are typically provided in conventional scale designs and could be easily implemented by one skilled in the art without undue experimentation.

One function provided by controller 30 is load cell excitation in block 300. Block 300 provides regulated +EXC and –EXC lines to drive the individual load cells through driving circuit 200. The excitation signals generated by block 300 may be alternating or direct current, typically between 3 and 30 volts. The manner of driving strain gauge bridges to sense force is generally known in the art, and thus, the electrical components necessary to provide the desired driving signals are not described herein.

Controller 30 accepts the output from load cell driver 200, which is first converted to digital form in an analog to digital conversion block 301 known in the art. As a result, the analog voltage present across the +OUT and –OUT terminals of circuit 200 is converted to a digital value.

Next, a tilt adjustment block 302 takes the digital output of block 301 and corrects the output for any tilt in the scale. This optional function, which is primarily useful in portable scales and the like wherein the orientation of the scale may change in operation, makes such scales more flexible since they do not need to be leveled prior to weighing. This is an especially beneficial feature on a lift truck scale, since lift trucks may be used on inclines, and additionally, since some lift trucks have the ability to tilt the forks from a neutral position.

It will be appreciated that as a surface tilts away from pure level, the vertical component of the force applied by an object resting on the surface will vary. Consequently, a tilt adjustment mechanism may be needed to compensate for the change in the vertical component of the force as a function of the degree of tilt of the surface.

As shown in FIG. 7, tilt sensors 304 and 306 are housed within junction box 20. Sensor 304 is oriented to measure the fore/aft tilt of the scale, and sensor 306 is oriented to measure the left/right tilt of the scale. Therefore, in combination, the outputs of sensor 304 and 306 may be able to determine the three dimensional tilt of a surface. Accordingly, sensors 304 and 306 must be positioned on the scale in a manner to sense the degree of tilt in both directions. While junction box 20 is a convenient location due to its direct mount on the scale and its protection from the environment, other positions for the sensors may also be envisioned.

Sensors 304 and 306 are preferably angular position sensors such as clinometers manufactured by Lucus. Other commercially available sensors may also be used.

The adjustment of an output signal for the degree of tilt of a surface is performed as described above in the principles of operation section, with the angles sensed by sensors 304 and 306 applied as angles $\phi_1$ and $\phi_2$ in the tilt equation developed above. Other known tilt adjustment routines may also be used consistent with the invention.

Calibration of the scale for tilt is necessary to adjust the scale electronic circuitry so that the scale output indicator indicates the correct weight when the scale is used within its operating range. The scale may also only display an output when operating within a predetermined tilt range.

Calibration may be performed in any manner known in the art to generate suitable constants for the aforementioned equation. For example, to calibrate the scale, known calibration loads may be placed on the scale when the scale is tilted in each direction of sensitivity to various degrees. The output signal may be recorded for these various loads and tilt angles and the calibration load values entered. Factors for the correction of linearity errors, tilt errors, and span may then be determined by any numerical analysis technique suitable for determining equations of functions to fit acquired data. The scale may also be operated to determine the limits of the tilt angles while maintaining an accurate scale reading. Scale output blanking angle set points may then be programmed or set so that the scale will only display correct weight readings.

After the digital output signal has been corrected for tilt, additional weight processing takes place in function block 308 to provide a user readable weight reading. Block 308 may rely on user input from block 312, which may include, for example, a keypad which permits a user to access various functions on the scale. Block 308 may also rely on a weight display 310, e.g. an LED or LCD display panel, for displaying the measured weight and other valuable information to the operator.

Block 308 may perform many functions for providing useful weight information to an operator. The functions provided by block 308 may include spanning the force reading to real world units (e.g., pounds or kilograms), averaging multiple samples over time to reduce transient errors, providing a tare function, a zero reset function, etc. In addition, block 308 may include diagnostic or calibration modes to configure and characterize the scale. Moreover, various data logging functions may be used to record and tabulate weight reading histories, and output functions may be included to transmit weight readings to an external source such as a printer or a host computer. Other scale functions, known in the art, may also be used consistent with the invention.

Controller 30 is preferably implemented in a microprocessor or microcontroller actuated system, which would include all necessary attendant support circuitry, including clocking, power supplies, volatile and nonvolatile memory, display drivers, etc. The power for the controller is preferably provided by the lift truck battery, although a separate power source may be used in the alternative.

Several advantages are attained through the use of the preferred scale and dual sensor load cells used therewith. For example, the preferred dual sensor load cells consistent with the invention have the advantage of isolating, measuring and rejecting out residual rejected effects from the load cell output, thereby offering greater accuracy and resistance to non-load force effects. This may enable less precise mechanical components to be used, may enable lower manufacturing tolerances on load cell bodies and strain gauges to be used, and may enable less precise strain gauge matching and placement, while still obtaining acceptable levels of accuracy. Therefore, lower cost load cells may be constructed having equal or greater accuracy than conventional load cell designs. Of course, should the same tolerances and manufacturing precision be used to construct preferred load cells as in prior designs, the accuracy of the new cells may be substantially greater.

Load cells consistent with the invention may also enable less complex and expensive mounting hardware to be used without severely reducing the accuracy of the overall system. For example, some applications such as truck scales (which measure the weight of over-the-road vehicles, for example) conventionally require a weighing platform to be coupled to multiple load cells through flexible attachments such as chains. This was done to center the load on the load cells and minimize any end effects applied thereto. Through the use of the load cells consistent with the invention, the end effects would be rejected electrically, rather than using such flexible coupling.

Accordingly, it will be appreciated that various modifications may be made to the preferred load cells, including different body designs, different transducers, different transducer placements, etc., without departing from the spirit and scope of the invention. For example, even two or more non-load sensors may be utilized to reject multiple yet disparate non-load effects from the output of the load cells. In the preferred circuitry for the load cells, this could be accomplished by placing multiple bridge circuits in parallel with the primary force sensor bridge. Other modifications will be apparent to one of skill in the art.

The preferred scales consistent with the invention also provide several advantages over conventional designs. For example, the preferred scales exhibit frictional effect rejection which is useful in many applications where two load cells are coupled in parallel through a non-perfect load receiving member and are spaced apart in the direction of the primary force vector. By scaling the sensitivities of the parallel load cells in the manner disclosed herein, any frictional effects in the mounting, such as due to slippage in the mounts which transfers load from one cell to another, will be cancelled out on the summed outputs of the load cells. Such frictional effects, primarily creep and hysteresis, may therefore be effectively rejected out in the manner disclosed herein.

One potential application of this feature would be a dual load cell system where the dual load cells provide increased capacity, yet better overall rejection of frictional effects than either load cell alone. The load cells used in such a system would be able to be constructed with lower tolerances and precision, and nonetheless obtain acceptable results from the electrical rejection of these inherent effects in the system.

In addition, the cornering correction provided by preferred scales is useful in any application where a load may be located at different points offset from the loading point for the load cells, particularly when it would be difficult or burdensome for an operator to precisely locate objects at a single point on the scale. The cornering correction capabilities of the invention are capable of rendering such scales substantially insensitive to load position, thereby rendering the scales easier to operate, and less intrusive on the daily routine of an operator.

It is therefore anticipated that the principles of the invention may be applied to various scale designs having multiple load cells in which frictional effects and/or positional sensitivity is conventionally exhibited by the scales. Accordingly, numerous modifications and changes to the preferred embodiments will be appreciated by one skilled in the art.

As various additional changes and modifications may be made to the preferred embodiments without departing from the spirit and scope of the invention, the invention therefore lies in the claims hereinafter appended.

What is claimed is:

1. A load cell, comprising:
   (a) a load cell body;
   (b) a first force sensor positioned on the load cell body to sense a load force applied to the load cell body along a first force vector, and provide a first output representative of the load force applied to the load cell;
   (c) a second force sensor positioned on the load cell body to sense non-load forces applied to the load cell body along a second force vector, and provide a second output representative of forces other than a load force applied to the load cell; and
   (d) means, coupled to receive the first and second outputs, for adjusting the first output based on the second output to reject residual rejected effects due to the non-load forces and generating a third output representative of a load force applied to the load cell.

2. The load cell of claim 1, wherein the load cell body includes a deformable member having a narrowed portion with opposing planar side surfaces, and wherein the first sensor is disposed on at least one of the side surfaces.

3. The load cell of claim 2, wherein the deformable member further includes opposing top and bottom surfaces oriented generally orthogonal to the side surfaces, and wherein the second sensor is disposed on at least one of the top and bottom surfaces.

4. The load cell of claim 2, wherein the deformable member is disposed between a threaded shank and a circular flange oriented generally orthogonal to a longitudinal axis of the shank.

5. The load cell of claim 1, wherein the first force sensor includes four force transducers electrically coupled in a wheatstone bridge circuit, two of the force transducers being oriented on the load cell body to be placed in tension in response to a force applied along the first force vector, and two of the force transducers being oriented on the load cell body to be placed in compression in response to a force applied along the first force vector.

6. The load cell of claim 5, wherein the second force sensor includes four force transducers electrically coupled in a wheatstone bridge circuit, two of the force transducers being oriented on the load cell body to be placed in tension in response to a force applied along the second force vector, and two of the force transducers being oriented on the load cell body to be placed in compression in response to a force applied along the second force vector.

7. The load cell of claim 6, wherein the force transducers in the first and second sensors each comprise a strain gauge.

8. The load cell of claim 7, wherein the first and second outputs of the first and second sensors are coupled in parallel, and wherein the rejection means comprises at least one resistor, coupled to the second output of the second sensor, for scaling the second output relative to the first output.

9. The load cell of claim 8, wherein the resistor is a variable resistor.

10. The load cell of claim 8, wherein the first and second sensors respectively include first and second inputs, each providing an excitation signal for driving the respective sensor, and wherein the rejection means further includes input scaling means for scaling the relative magnitudes of the excitation signals provided to the first and second sensors through the first and second inputs.

11. The load cell of claim 10, further comprising temperature compensating means for compensating the first sensor for the effects of temperature, the temperature compensating means including at least one thermistor coupled to the first input of the first sensor.

12. The load cell of claim 1, wherein the rejection means includes scaling means, responsive to the second output, for scaling the first output to reject residual rejected effects therefrom and thereby provide the third output.

13. The load cell of claim 12, wherein the first and second sensors respectively include first and second inputs for receiving an excitation voltage, wherein the first and second sensors each comprise a resistive network which varies in resistance in response to the applied force along the respective force vector, and wherein the first and second outputs of the first and second sensors are coupled in parallel.

14. The load cell of claim 13, wherein the scaling means comprises at least one resistor, coupled to one of the first and second outputs, for scaling the resistance across the one of the first and second outputs relative to the other of the first and second outputs.

15. The load cell of claim 13, wherein the scaling means comprises input scaling means for scaling the relative magnitudes of the first and second inputs driving the first and second sensors.

16. A method of sensing force with a load cell having a load cell body and first and second force sensors positioned thereon to sense forces applied to the load cell body respectively along first and second force vectors, the method comprising the steps of:

(a) sensing a load force applied to the load cell body along the first force vector with the first force sensor and generating a first output representative of the load force applied to the load cell body;

(b) sensing non-load forces applied to the load cell body along the second force vector with the second force sensor and generating a second output representative of forces other than a load force applied to the load cell; and (c) scaling the first output in response to the second output to reject residual rejected effects from the first output to generate a load force signal.

17. A scale, comprising:

(a) a base;

(b) a force receiving member adapted to receive an object to be weighed;

(c) a plurality of load cells coupled between the force receiving member and the base to deflect in response to a force applied to the force receiving member by the object, each load cell having a first output primarily responsive to at least a portion of the force applied by the object, and a second output primarily responsive to residual rejected effects sensed by the load cell; and (d) load cell driving means for providing a force signal representative of the force applied to the force receiving member by the object, the driving means including:

(1) means, coupled to the first and second outputs of each load cell, for adjusting the first output of each load cell based on the second output for each load cell to reject residual rejected effects;

(2) cornering means for adjusting the relative sensitivities of the first outputs of the load cells such that the sum of the first outputs is insensitive to the position of the object on the force receiving member; and (3) summing means for summing the first outputs of the load cells to provide the force signal.

18. The scale of claim 17, wherein the base and the force receiving member respectively include first and second vertically oriented plates, and wherein the plurality of load cells include first and second load cells laterally spaced from one another and extending substantially perpendicular to the first and second plates.

19. The scale of claim 18, wherein the force receiving member further includes a pair of forks mounted to the second plate which extend outwardly from the second plate generally perpendicular to an outer surface thereof.

20. The scale of claim 19, wherein the first plate includes at least one hook for securing the first plate to a crossbar on a lift truck; whereby the scale is a lift truck scale.

21. The scale of claim 19, wherein the plurality of load cells further includes third and fourth load cells respectively aligned in vertical columns with the first and second load cells.

22. The scale of claim 19, further comprising at least first and second flexures respectively aligned in vertical columns with the first and second load cells.

23. The scale of claim 22, wherein the first and second plates each include two laterally spaced vertical columns of at least two mounting apertures, and wherein the load cells and the flexures have identical mounting hardware; whereby the load cells and the flexures are interchangeably mountable in each mounting aperture.

24. The scale of claim 17, wherein the first and second outputs of each load cell are generated by first and second force sensors, respectively positioned on the load cell to sense first and second forces applied to the load cell along first and second force vectors, each force sensor including four force transducers electrically coupled in a wheatstone bridge circuit, two of the force transducers being oriented to be placed in tension in response to a force applied along the respective force vector, and two of the force transducers being oriented to be placed in compression in response to the force applied along the respective force vector.

25. The scale of claim 24, wherein the force transducers include strain gauges.

26. The scale of claim 24, wherein the first and second outputs of the first and second sensors are coupled in parallel, and wherein the rejection means comprises at least one resistor, coupled to the second output of the second sensor, for scaling the second output relative to the first output.

27. The scale of claim 24, wherein the plurality of load cells include a top left, a top right, a bottom left, and a bottom right load cell spaced apart from one another in a generally vertical plane.

28. The scale of claim 27, wherein the first and second sensors respectively include first and second inputs, each providing an excitation signal for driving the respective sensor, and wherein the rejection means includes input scaling means for scaling the relative magnitudes of the excitation signals provided to the first and second sensors through the first and second inputs.

29. The scale of claim 28, wherein the first and second inputs of the first and second sensors are coupled to a common excitation signal, and wherein the input scaling means includes first and second top/bottom trim potentiometers coupled to the common excitation signal, the first top/bottom trim potentiometer coupled between the second inputs to the top left and bottom left load cells, and the second top/bottom trim potentiometer coupled between the second inputs to the top right and bottom right load cells so that residual rejected effects are rejected by adjusting the first and second trim potentiometers.

30. The scale of claim 29, wherein the cornering means includes excitation scaling means for scaling the excitation signals to the first inputs of the load cells relative to one another.

31. The scale of claim 30, wherein the excitation scaling means includes a left/right balance potentiometer coupled to the common excitation signal and first and second top/ bottom balance potentiometers each coupled to the left/right balance potentiometer, the first top/bottom balance potentiometer coupled between the first inputs to the top left and bottom left load cells, and the second top/bottom balance potentiometer coupled between the first inputs to the top right and bottom right load cells; whereby the scale is cornered by adjusting the left/right and top/bottom balance potentiometers.

32. The scale of claim 31, further comprising zeroing means, coupled across the common excitation signal, for zeroing the force signal when no external force is applied to the force receiving member, the zeroing means comprising a potentiometer driven by the force signal.

33. The scale of claim 17, wherein the rejection means includes scaling means, responsive to the second output of each load cell, for scaling the first output of each load cell to reject residual rejected effects therefrom.

34. The scale of claim 33, wherein each load cell includes a sensor for generating the first output, the sensor including an input for receiving an excitation voltage, wherein each sensor comprises a resistive network which varies in resistance in response primarily to the force applied by the object, and wherein the cornering means includes excitation scaling means for scaling the relative magnitudes of the inputs to the sensors on the plurality of load cells.

35. The scale of claim 17, wherein the summing means comprises means for coupling the first outputs of the load cells to a common output signal.

36. The scale of claim 17, further comprising tilt adjusting means for adjusting the force signal to compensate for tilt in the force receiving member, the tilt adjusting means including first and second tilt sensors.

37. The scale of claim 36, wherein the tilt adjusting means generates a tilt adjusted signal from the force signal by applying the equation:

$$W = \frac{S}{A} \cdot \sqrt{1 + \tan^2(\phi_1 + \delta_1) + \tan^2(\phi_2 + \delta_2)}$$

where W is the tilt adjusted signal, S is the force signal, $\phi_1$ is the first tilt angle, $\phi_2$ is the second tilt angle, $\delta_1$ and $\delta_2$ are phase shift constants, and A is a sensitivity factor constant.

38. A method of weighing an object on a scale including a plurality of load cells coupled between a force receiving member and a base to deflect in response to a force applied to the force receiving member by the object, each load cell having a first output primarily responsive to at least a portion of the force applied by the object, and a second output primarily responsive to residual rejected effects sensed by the load cell, the method comprising the steps of:

(a) scaling the first output of each load cell in response to the second output of the load cell to reject residual rejected effects from the first output of each load cell;

(b) adjusting the relative sensitivities of the first outputs of the load cells such that the sum of the first outputs is substantially insensitive to the position of the object on the force receiving member; and (c) summing the first outputs of the load cells to provide the force signal.

* * * * *